US010128996B2

United States Patent
Seo et al.

(10) Patent No.: US 10,128,996 B2
(45) Date of Patent: Nov. 13, 2018

(54) METHOD FOR TRANSMISSION DEVICE-TO-DEVICE SIGNAL IN WIRELESS COMMUNICATION SYSTEM AND APPARATUS FOR SAME

(71) Applicant: LG ELECTRONICS INC., Seoul (KR)

(72) Inventors: Hanbyul Seo, Seoul (KR); Suckchel Yang, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 17 days.

(21) Appl. No.: 15/306,030

(22) PCT Filed: Apr. 30, 2015

(86) PCT No.: PCT/KR2015/004416
§ 371 (c)(1),
(2) Date: Oct. 21, 2016

(87) PCT Pub. No.: WO2015/167289
PCT Pub. Date: Nov. 5, 2015

(65) Prior Publication Data
US 2017/0048038 A1 Feb. 16, 2017

Related U.S. Application Data

(60) Provisional application No. 61/986,845, filed on Apr. 30, 2014, provisional application No. 61/990,078, (Continued)

(51) Int. Cl.
*H04L 5/00* (2006.01)
*H04W 72/04* (2009.01)
(Continued)

(52) U.S. Cl.
CPC .............. *H04L 5/0048* (2013.01); *H04L 5/00* (2013.01); *H04L 5/0082* (2013.01); *H04L 27/26* (2013.01);
(Continued)

(58) Field of Classification Search
CPC ......... H04L 5/00; H04L 27/26; H04L 5/0048; H04L 5/0082; H04L 61/3015;
(Continued)

(56) References Cited

U.S. PATENT DOCUMENTS

2014/0293968 A1* 10/2014 Ebrahimi Tazeh Mahalleh ..........
H04W 56/001
370/336
2014/0328329 A1* 11/2014 Novlan ............... H04W 72/042
370/336
(Continued)

FOREIGN PATENT DOCUMENTS

WO 2013165145 11/2013
WO 2014010956 1/2014

OTHER PUBLICATIONS

European Patent Office Application Serial No. 15785496.9, Search Report dated Dec. 1, 2017, 13 pages.
(Continued)

*Primary Examiner* — Kashif Siddiqui
(74) *Attorney, Agent, or Firm* — Lee, Hong, Degerman, Kang & Walmey

(57) ABSTRACT

The present invention provides a method for transmitting a device-to-device (D2D) signal and an apparatus for the same, which are used in a wireless access system supporting D2D communication. According to one aspect of the present invention, the method for transmitting a D2D signal by a terminal comprises the steps of: receiving, from a base station, sounding reference signal configuration information
(Continued)

instructing an uplink subframe to transmit a sounding reference signal; and determining whether to transmit the D2D signal in a D2D subframe set in a specific subframe when the specific subframe is included in the sounding reference signal configuration information.

10 Claims, 19 Drawing Sheets

Related U.S. Application Data filed on May 7, 2014, provisional application No. 62/054,366, filed on Sep. 23, 2014.

(51) Int. Cl.
*H04W 76/10* (2018.01)
*H04W 76/14* (2018.01)
*H04L 27/26* (2006.01)

(52) U.S. Cl.
CPC ....... *H04W 72/0446* (2013.01); *H04W 76/14* (2018.02)

(58) Field of Classification Search
CPC ............ H04L 61/609; H04W 72/0446; H04W 76/023; H04W 64/00
See application file for complete search history.

(56) References Cited

U.S. PATENT DOCUMENTS

| | | | |
|---|---|---|---|
| 2015/0092689 A1* | 4/2015 | Ko | H04L 1/1861 370/329 |
| 2015/0098422 A1* | 4/2015 | Sartori | H04W 8/005 370/329 |
| 2015/0215881 A1* | 7/2015 | Parkvall | H04W 56/002 370/350 |
| 2015/0264551 A1 | 9/2015 | Ko et al. | |
| 2016/0337839 A1* | 11/2016 | Chae | H04W 8/005 |

OTHER PUBLICATIONS

Qualcomm, "D2D Transmission Timing", 3GPP TSG RAN WG1 Meeting #76, R1-140458, Feb. 2014, 4 pages.

Huawei, "Co-existence of Normal CP OFDM symbol and Extended CP OFDM symbol in D2D communication/discovery", 3GPP TSG RAN WG1 Meeting #76b, R1-141591, Apr. 2014, 5 pages.

LG Electronics, "D2D Discovery Signal Transmission Timing", 3GPP TSG RAN WG1 Meeting #76, R1-140339, Feb. 2014, 11 pages.

LG Electronics, "Other Remaining Issues for D2D and WAN co-existence", 3GPP TSG RAN WG1 Meeting #78, R1-143187, Aug. 2014, 4 pages.

PCT International Application No. PCT/KR2015/004416, Written Opinion of the International Searching Authority dated Aug. 18, 2015, 21 pages.

Huawei et al., "Impact of D2D on cellular", R1-141597, 3GPP TSG RAN WG1 Meeting #76bis, Mar. 22, 2014, 4 pages.

ZTE, "D2D Discovery Transmission Timing", R1-140274, 3GPP TSG RAN WG1 Meeting #76, Jan. 31, 2014, 5 pages.

LG Electronics, "Discussion on D2D signal transmission and reception timing", R1-141359, 3GPP TSG RAN WG1 Meeting #76bis, Mar. 22, 2014, 6 pages.

ZTE, "D2D Synchronization and Timing", R1-134306, 3GPP TSG RAN WG1 Meeting #74bis, Sep. 28, 2013, 8 pages.

Mexican Institute of Industrial Property Application No. MX/a/2016/014114, Office Action, dated Apr. 17, 2018, 4 pages.

\* cited by examiner

FIG. 2
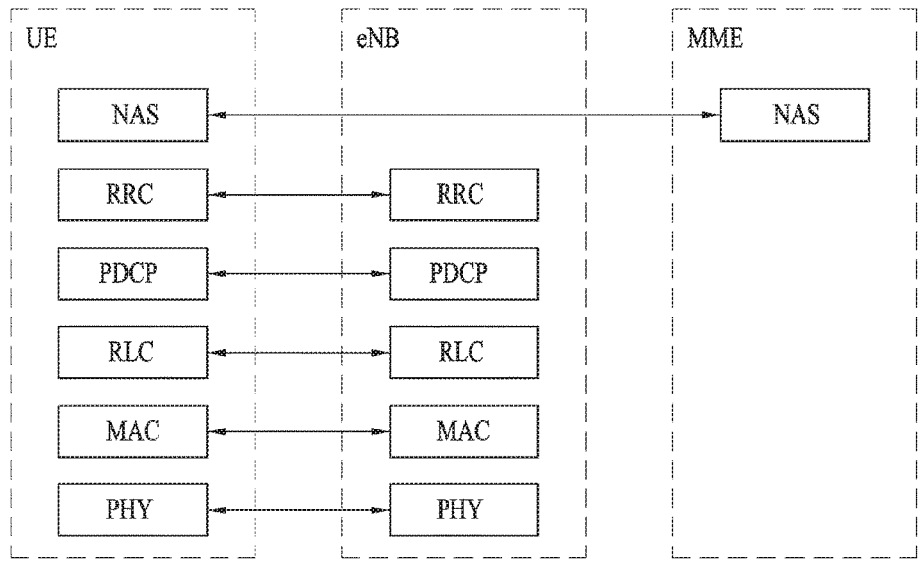
(a) Control-plane protocol stack
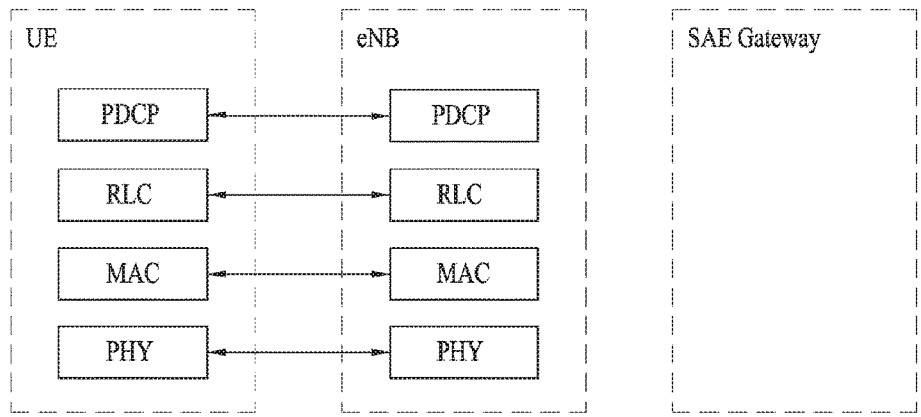
(b) User-plane protocol stack

* Transient period is only specified in the case of frequency hopping or a power change between SRS symbols

METHOD FOR TRANSMISSION DEVICE-TO-DEVICE SIGNAL IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2015/004416, filed on Apr. 30, 2015, which claims the benefit of U.S. Provisional Application No. 61/986,845, filed on Apr. 30, 2014, 61/990,078, filed on May 7, 2014 and 62/054,366, filed on Sep. 23, 2014, the contents of which are all hereby incorporated by reference herein in their entirety.

TECHNICAL FIELD

The present invention relates to a wireless communication system, and more particularly, to a method and apparatus for transmitting a Device-to-Device (D2D) signal in a wireless communication system.

BACKGROUND ART

A structure of a 3GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE

Technical Problem

An object of the present invention is to provide a method and apparatus for transmitting a Device-to-Device (D2D) signal in a wireless communication system supporting D2D communication.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention provides a method and apparatus for transmitting a Device-to-Device (D2D) signal in a wireless communication system supporting D2D communication.

In one aspect of the present invention, a method for transmitting and receiving a D2D signal by a User Equipment (UE) in a wireless communication system may include receiving Sounding Reference Signal (SRS) configuration information from a Base Station (BS), the SRS configuration information indicating an uplink subframe for SRS transmission, and if a specific subframe is included in the SRS configuration information, determining whether to transmit a D2D signal in a D2D subframe configured in the specific subframe.

The method may further include transmitting an SRS in the uplink subframe to the BS.

In another aspect of the present invention, a UE for transmitting and receiving a D2D signal in a wireless communication system may include a transceiver module for receiving SRS configuration information from a BS, the SRS configuration information indicating an uplink subframe for SRS transmission, and a processor. If a specific subframe is included in the SRS configuration information, the processor may determine whether to transmit a D2D signal in a D2D subframe configured in the specific subframe. The processor may determine whether to transmit a D2D signal in the D2D subframe based on a Cyclic Prefix (CP) of the D2D subframe and a CP of the uplink subframe.

The followings are applicable commonly to the above aspects of the present invention.

If the D2D subframe and the uplink subframe have the same CP in the specific subframe, it may be determined to transmit the D2D signal in the D2D subframe. A last symbol of the D2D subframe configured for transmission of the D2D signal may be configured as a guard period.

It may be determined whether to transmit a D2D signal in the D2D subframe based on whether a Timing Advance (TP) is applied.

If the TA is applied to transmission of the D2D signal, it may be determined to transmit the D2D signal in the D2D subframe.

Also, if the D2D subframe and the uplink subframe have different CPs, the D2D signal may be dropped in the D2D subframe.

The above aspect of the present invention are mere parts of preferred embodiments of the present invention, and those skilled in the art will derive and understand various embodiments reflecting technical features of the present invention based on the following detailed description of the present invention.

Advantageous Effects

According to the present invention, a Device-to-Device (D2D) signal can be efficiently transmitted and received in a wireless communication system. Specifically, when Sounding Reference Signal (SRS) transmission is configured, a D2D signal can be efficiently transmitted and received.

The effects of the present invention are not limited to the above-described effects and other effects which are not described herein will be understood by those skilled in the art from the following description of the embodiments of the present invention.

BRIEF DESCRIPTION OF THE DRAWINGS

The accompanying drawings, which are included to provide a further understanding of the invention, illustrate embodiments of the invention and together with the description serve to explain the principle of the invention.

FIG. 2 illustrates the architecture of control-plane and user-plane radio interface protocols between a User Equipment (UE) and an Evolved UMTS Terrestrial Radio Access Network (E-UTAN), conforming to the $3^{rd}$ Generation Partnership Project (3GPP) radio access network standards.

(a) of FIG. 19 illustrates an exemplary general ON/OFF time mask applicable to the present invention.

(b) of FIG. 19 illustrates an exemplary single Sounding Reference Signal (SRS) time mask.

(c) of FIG. 19 illustrates exemplary dual SRS time masks.

(d) of FIG. 19 illustrates an exemplary time mask at a slot/subframe boundary.

(e) of FIG. 19 to (h) of FIG. 19 illustrate exemplary Physical Uplink Control Channel (PUCCH)/Physical Uplink Shared Channel (PUSCH)/SRS time masks.

Figure 20:
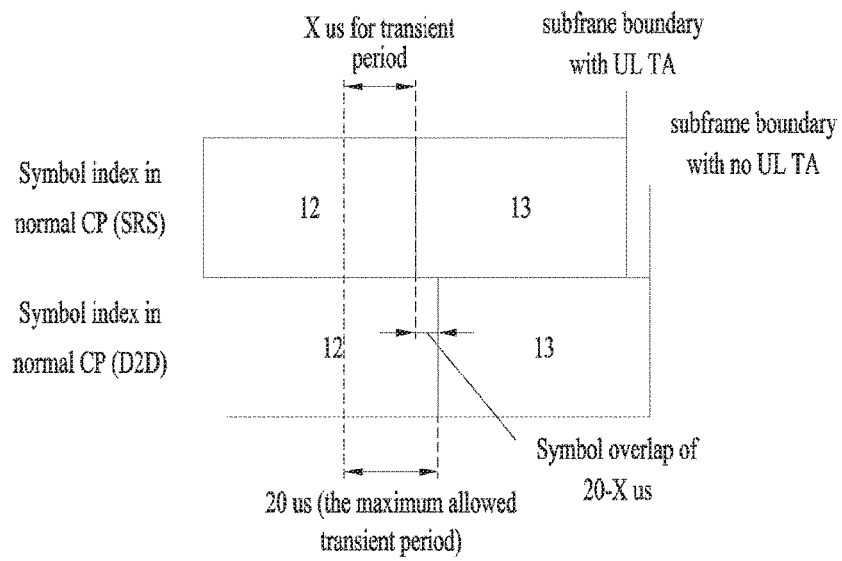

FIG. 20 is a view depicting a relationship between a transient period and overlap.

Figure 21:
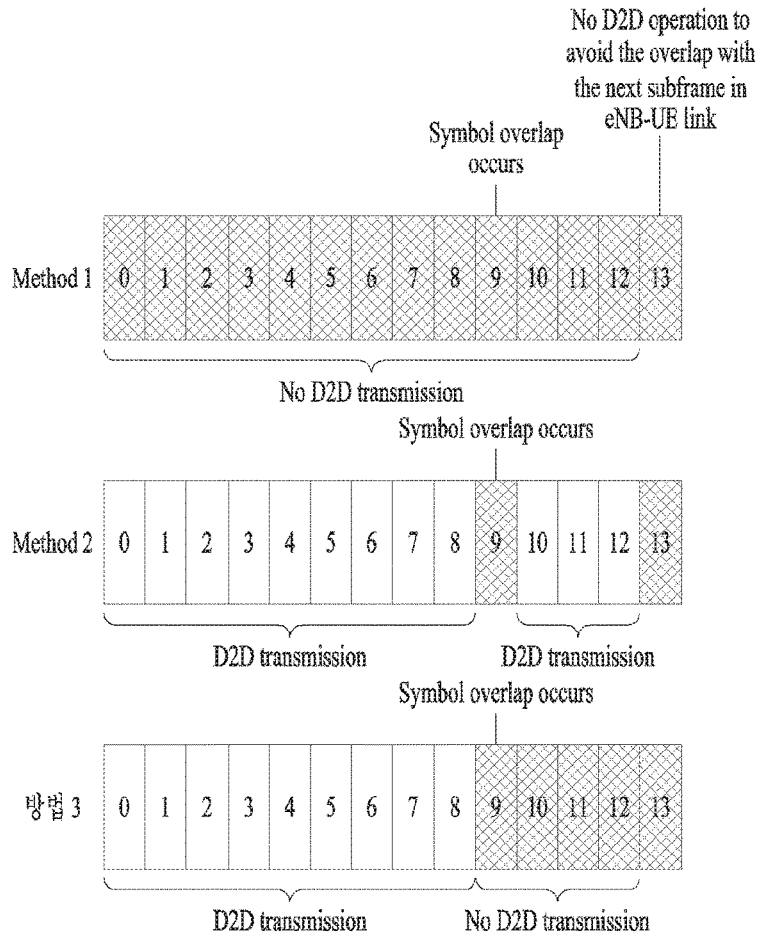

FIG. 21 is a view depicting transmission discontinuation of a UE, when an overlap occurs according to an embodiment of the present invention.

Figure 22:
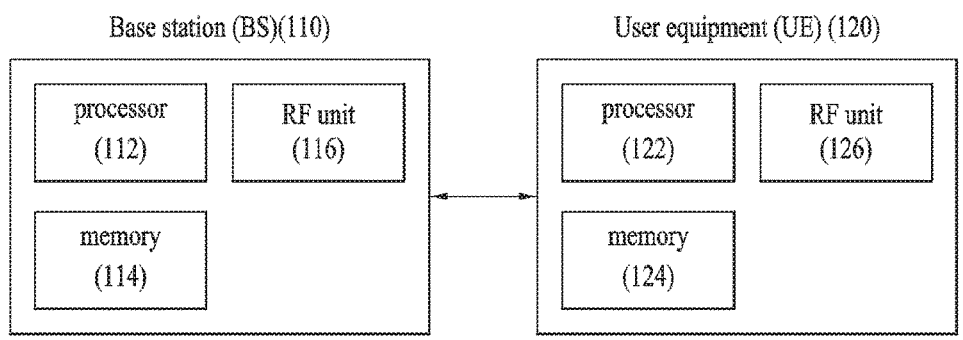

FIG. 22 is a block diagram of a Base Station (BS) and a UE which are applicable to an embodiment of the present invention.

BEST MODE

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System).

For clarity, the following description focuses on the 3GPP LTE and 3GPP LTE-A system. However, technical features of the present invention are not limited thereto.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 1:
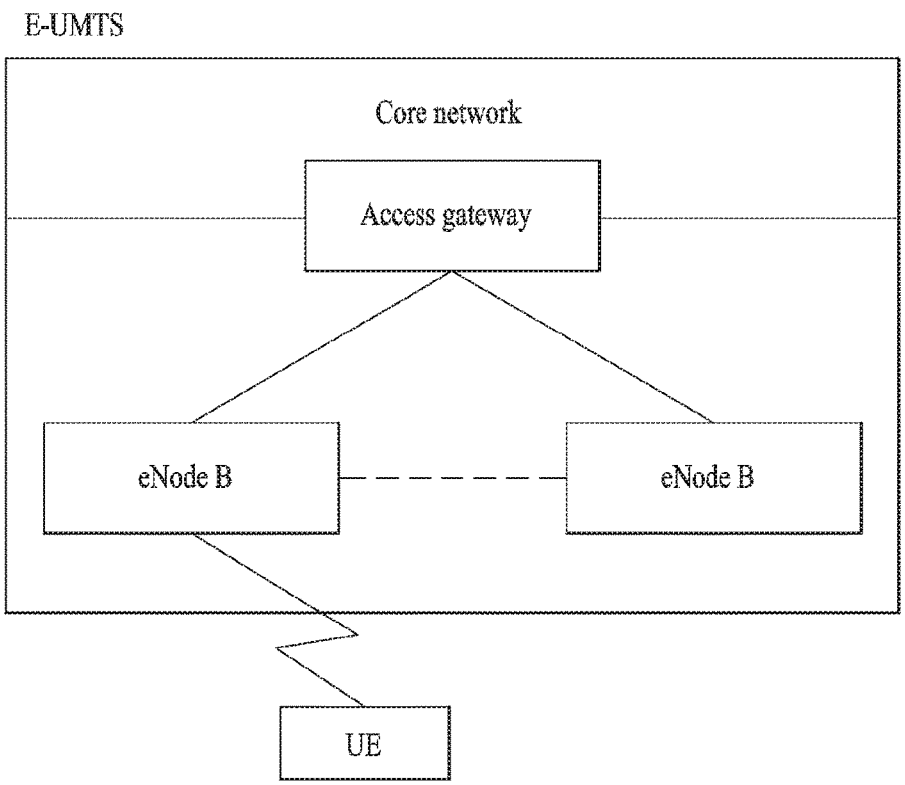
FIG. 1 illustrates a configuration of an Evolved Universal Mobile Telecommunications System (E-UMTS) network as an exemplary wireless communication system.
Figure 3:
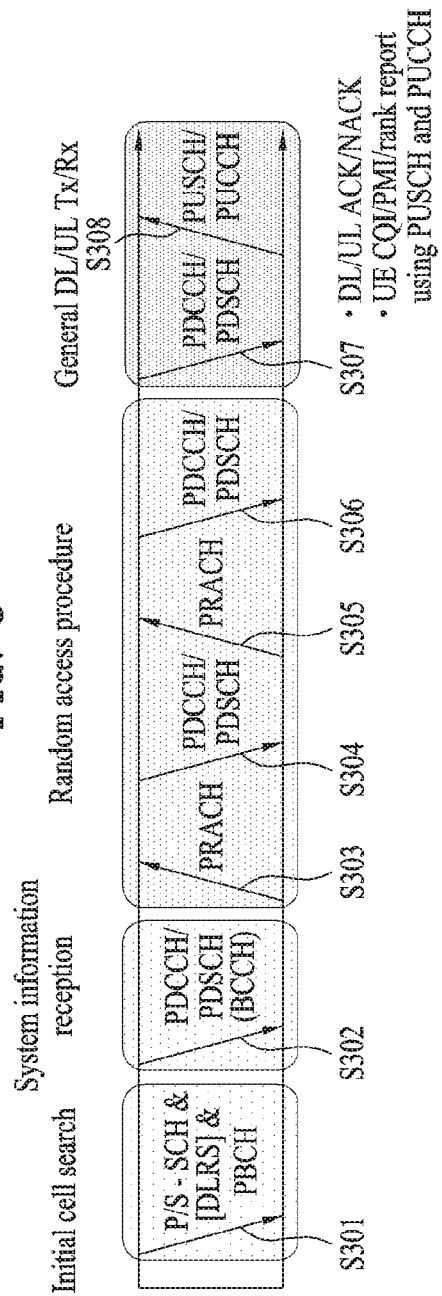
FIG. 3 illustrates physical channels used in a 3GPP Long Term Evolution (3GPP LTE) system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose. Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
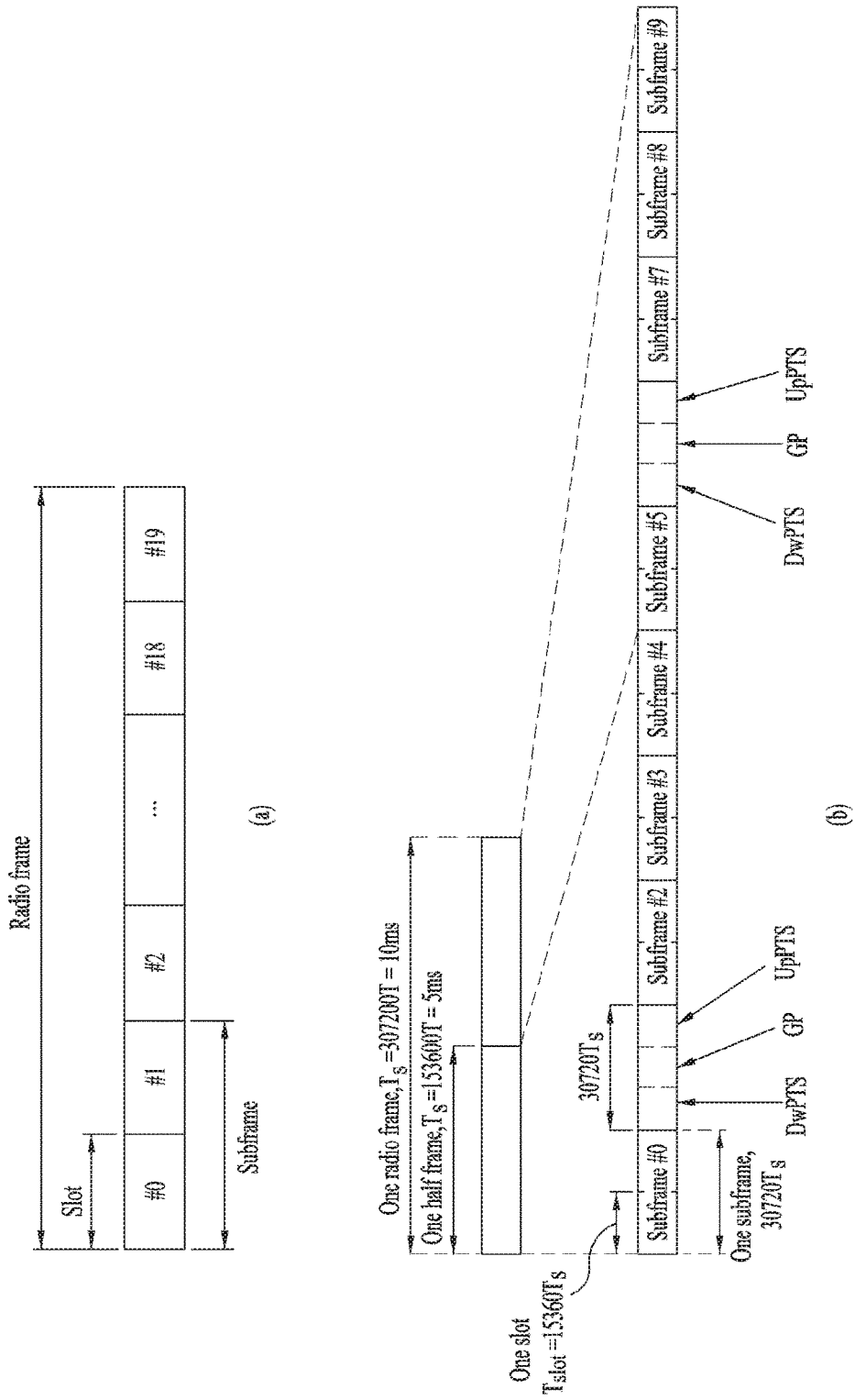
FIG. 4 illustrates a structure of a radio frame used in an LTE system.

The structure of a radio frame of 3GPP LTE system will be described with reference to FIG. 4.

In a cellular Orthogonal Frequency Division Multiplexing (OFDM) radio packet communication system, uplink/downlink data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 4(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 4(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots.

The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The current 3GPP standard document defines configuration of the special subframe as shown in Table 2 below. Table 2 shows DwPTS and UpPTS given when TS=1/(15000*2048), and the other region is configured as a GP.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the LTE TDD system, uplink/downlink subframe configurations (UL/DL configurations) are given as shown in Table 1 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe, and S denotes the special subframe. Table 1 also shows downlink-to-uplink switch-point periodicity in uplink/downlink subframe configuration of each system.

The structure of the above radio frame is just example. The number of a subframe, the number of slot included in a subframe or the number of symbol included in a slot included in the radio frame can be changed.

Figure 5:
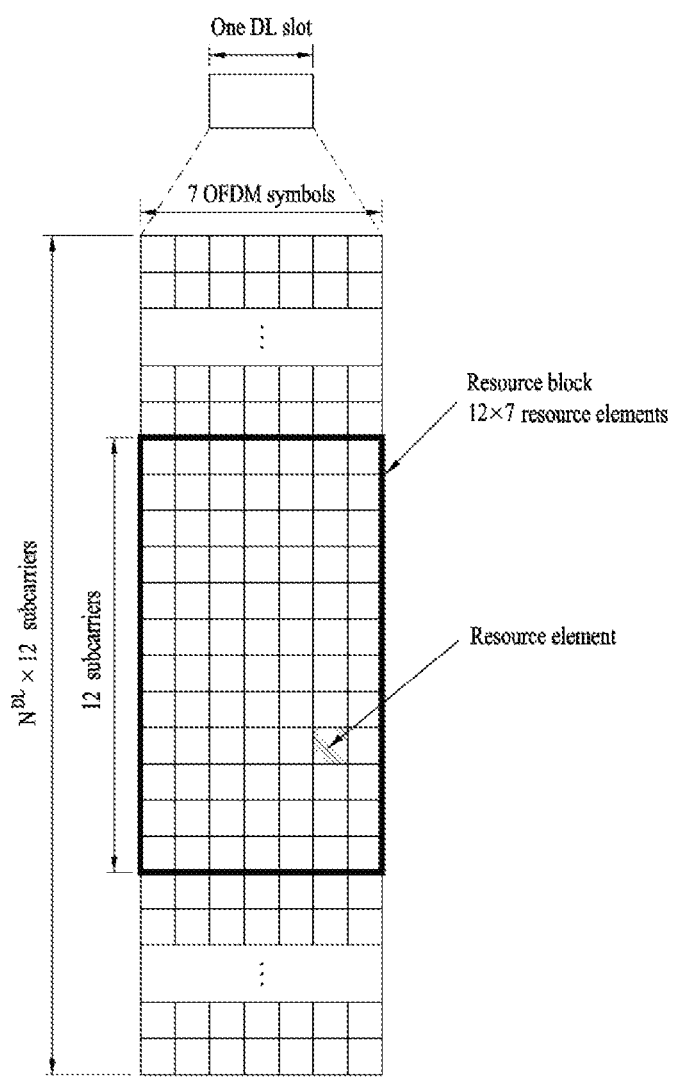
FIG. 5 illustrates a resource grid during the duration of a Downlink (DL) slot.

FIG. 5 is a diagram illustrating a resource grid for a downlink slot.

Referring to FIG. 5, a DL slot includes $N_{symb}^{DL}$ OFDM symbols in the time domain and $N_{RB}^{DL}$ resource blocks in the frequency domain. Since each resource block includes $N_{sc}^{RB}$ subcarriers, the DL slot includes $N_{RB}^{DL} \times N_{sc}^{RB}$ subcarriers in the frequency domain. Although FIG. 5 illustrates that the DL slot includes seven OFDM symbols and the resource block includes twelve subcarriers, it is to be understood that the downlink slot and the resource block are not limited thereto. For example, the number of OFDM symbols included in the downlink slot may be varied depending on a length of CP (cyclic prefix).

Each element on the resource grid is referred to as a resource element (RE). One resource element is indicated by one OFDM symbol index and one subcarrier index. One RB includes $N_{symb}^{DL} \times N_{sc}^{RB}$ number of REs. The number $N_{RB}^{DL}$ of RBs included in the DL slot depends on a DL transmission bandwidth configured in a cell.

Figure 6:
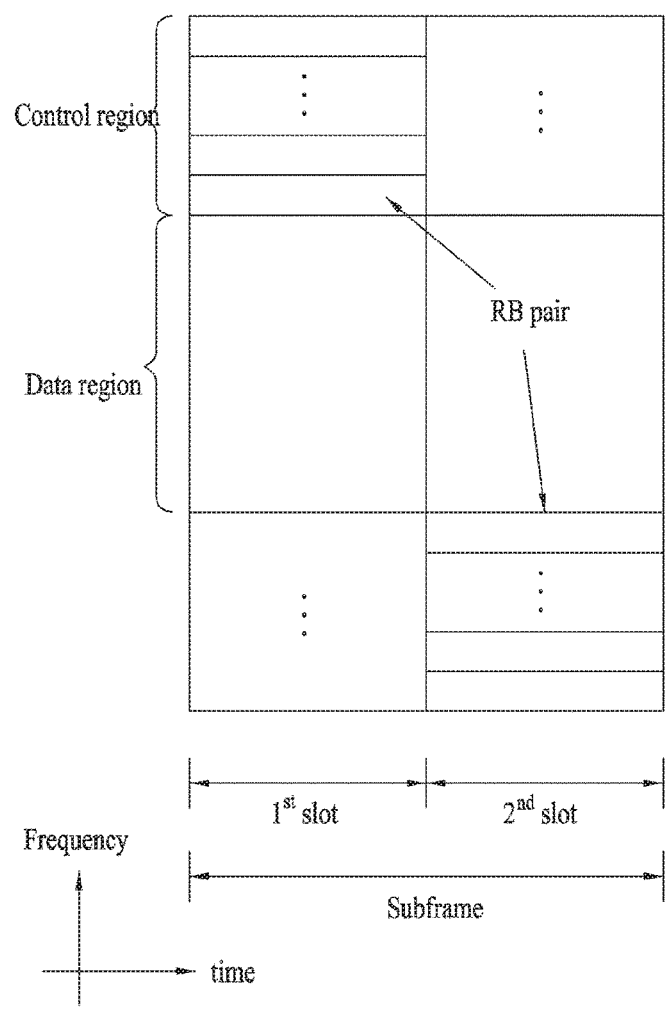
FIG. 6 illustrates an exemplary structure of a DL subframe.

FIG. 6 illustrates a structure of an uplink subframe applicable to embodiments of the present invention.

Referring to FIG. 6, a UL subframe may be divided into a control region and a data region in the frequency domain. A PUCCH for carrying uplink control information is allocated to the control region and a PUSCH for carrying user data is allocated to the data region. In the LTE system, a UE does not simultaneously transmit the PUCCH and the PUSCH to maintain a single carrier property. However, in the LTE-A system, a PUCCH signal and a PUSCH signal can be simultaneously transmitted due to the introduction of carrier aggregation technology. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Figure 7:
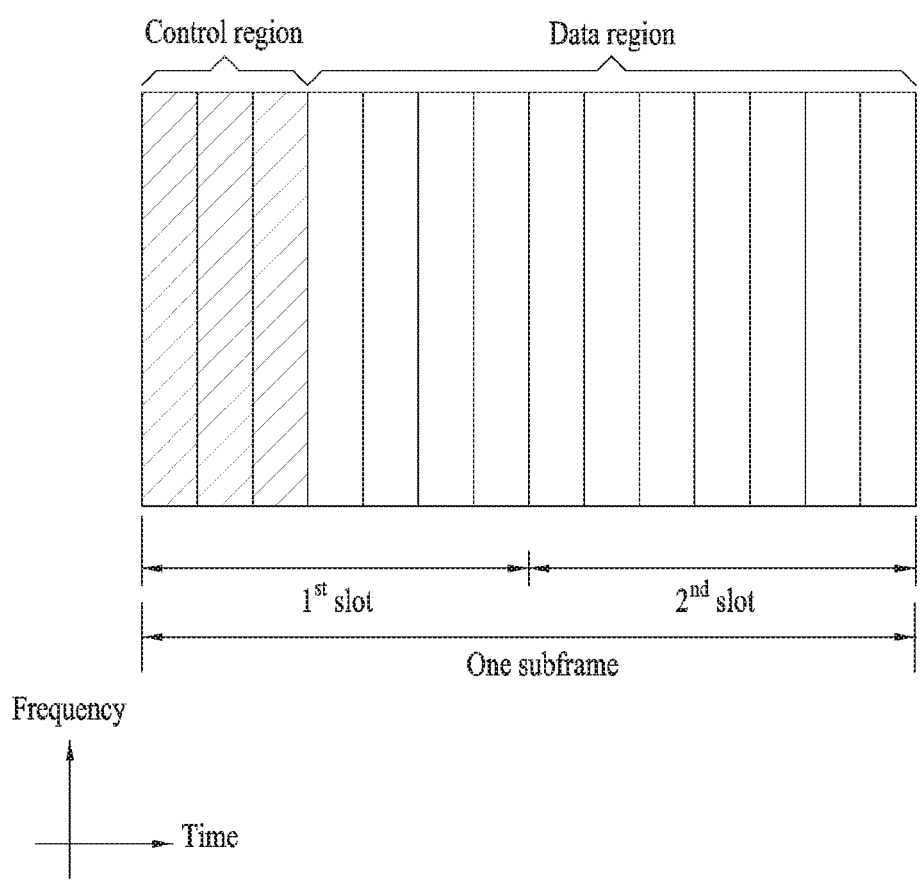
FIG. 7 illustrates a structure of an Uplink (UL) subframe in an LTE system.

FIG. 7 is a diagram illustrating a structure of a downlink subframe applicable to embodiments of the present invention.

Referring to FIG. 7, a maximum of three OFDM symbols from OFDM symbol index #0 of a first slot in a subframe correspond to a control region to be assigned with a control channel. The remaining OFDM symbols correspond to a data region to be assigned with a PDSCH. Examples of downlink control channels used in the 3GPP LTE system includes a physical control format indicator channel (PCFICH), a physical downlink control channel (PDCCH), a physical hybrid ARQ indicator channel (PHICH), etc.

The PCFICH is transmitted in a first OFDM symbol of a subframe and carries information on the number of OFDM symbols used for transmission of control channels (i.e. the size of the control region) in the subframe. The PHICH is a channel in response to UL transmission and carries ACK/NACK (acknowledgement/negative-acknowledgement) signal for HARQ (hybrid automatic repeat request). Control information transmitted through the PDCCH is called downlink control information (DCI). The DCI includes UL resource allocation information, DL resource allocation information, or UL transmit (TX) power control commands for a random UE group.

Carrier Aggregation

Figure 8:
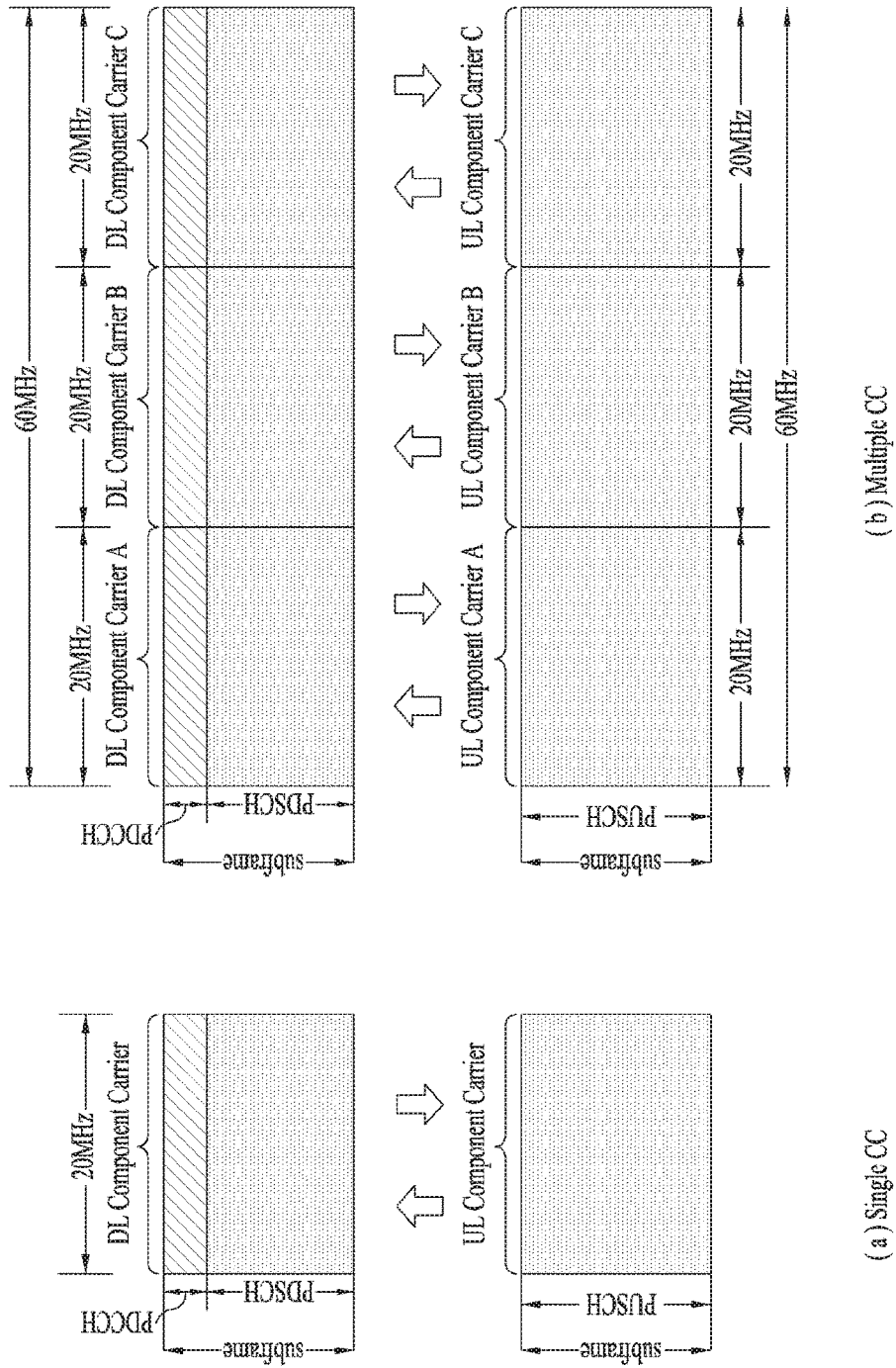
FIG. 8 is a view depicting carrier aggregation.

FIG. 8 is a diagram for explaining carrier aggregation. Before description is given of carrier aggregation, the concept of a cell introduced to manage radio resources in LTE-A will be described first. A cell may be regarded as a combination of downlink resources and uplink resources. The uplink resource is not an essential element of the cell. The uplink resources are not essential elements and thus the cell may be composed of the downlink resources only or both of the downlink resources and uplink resources. However, this is the definition defined in the LTE-A release 10 and the cell may be composed of the uplink resources only. The DL resource may be called a downlink component carrier (DL CC) and the UL resource may be called an uplink compo-nent carrier (UL CC). The UL CC and the DL CC can be represented by a carrier frequency. The carrier frequency means a center frequency of a corresponding cell.

Cells may be divided into a primary cell (PCell), which operates at a primary frequency, and a secondary cell (SCell), which operates at a secondary frequency. The PCell and the SCell may be collectively referred to as a serving cell. The PCell may be designated during an initial connection establishment, connection re-establishment or handover procedure of a UE. In other words, the PCell may be understood as a cell that serves as a control-related center in a carrier aggregation environment, which will be described in detail later. A UE may be assigned a PUCCH in the PCell thereof and may then transmit the assigned PUCCH. The SCell may be configured after establishment of radio resource control (RRC) connection and it may be used for providing additional radio resources. In the carrier aggregation environment, all serving cells except the PCell may be considered as SCells. In case that a UE in an RRC_CONNECTED state fails to establish the carrier aggregation or does not support the carrier aggregation, only a single serving cell consisting of PCells exists. On the other hand, in the case in which a UE is in the RRC_CONNECTED state and the carrier aggregation is established, one or more serving cells exist. Moreover, in this case, PCells and all SCells are included in the serving cells. After starting an initial security activation procedure, a network may configure one or more SCells in addition to the PCell configured at the beginning of the connection establishment procedure for a UE supporting the carrier aggregation.

Hereinafter, the carrier aggregation is described with reference to FIG. 8. The carrier aggregation is a technology introduced to allow the use of a broader band to meet the demands for a high-speed transmission rate. The carrier aggregation may be defined as aggregation of two or more component carriers (CCs) having different carrier frequencies or aggregation of two or more cells. Referring to FIG. 8, FIG. 8(a) shows a subframe in the legacy LTE system in which one CC is used and FIG. 8(b) shows a subframe to which the carrier aggregation is applied. Particularly, FIG. 8 (b) illustrates an example in which a bandwidth of total 60 MHz is supported in a manner of using three CCs of 20 MHz. In this case, the three CCs may be contiguous or non-contiguous.

A UE may simultaneously receive and monitor downlink data through a plurality of DL CCs. Linkage between a DL CC and a UL CC may be indicated by system information. The DL CC/UL CC link may be fixed in the system or may be semi-statically configured. Additionally, even if an entire system band is configured with N CCs, a frequency band that can be monitored/received by a specific UE may be limited to M(<N) CCs. Various parameters for the carrier aggregation may be set up cell-specifically, UE group-specifically, or UE-specifically.

Figure 9:
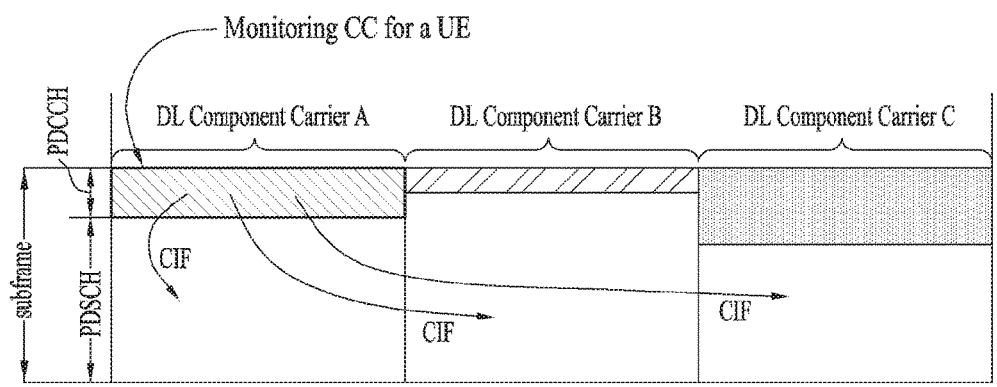
FIG. 9 is a view depicting cross-carrier scheduling.

FIG. 9 is a diagram for explaining cross carrier scheduling. For instance, the cross carrier scheduling means to include all DL scheduling allocation information of a DL CC in a control region of another DL CC selected from a plurality of serving cells. Alternatively, the cross carrier scheduling means to include all UL scheduling grant information on a plurality of UL CCs, which are linked to a DL CC selected among a plurality of serving cells, in a control region of the DL CC.

Hereinafter, a carrier indicator field (CIF) will be described.

As described above, the CIF may be included in a DCI format transmitted through a PDCCH (in this case, a size of the CIF may be defined as, for example, 3 bits) or may not be included in the DCI format (in this case, a size of the CIF may be defined as 0 bit). If the CIF is included in the DCI format, this indicates that the cross-carrier scheduling is applied. In case that the cross-carrier scheduling is not applied, downlink scheduling allocation information is valid for a DL CC through which the downlink scheduling allocation information is currently transmitted. In addition, an uplink scheduling grant is valid for a UL CC linked to the DL CC through which the downlink scheduling allocation information is transmitted.

In case that the cross-carrier scheduling is applied, the CIF indicates a CC related to the downlink scheduling allocation information which is transmitted over the PDCCH in a DL CC. For example, referring to FIG. 9, downlink allocation information on DL CC B and DL CC C, i.e., information on PDSCH resources, is transmitted through a PDCCH in a control region of DL CC A. After monitoring DL CC A, a UE may recognize that a resource region of PDSCH and the corresponding CC.

Whether or not the CIF is included in the PDCCH may be set semi-statically and the CIF may be enabled UE-specifically through higher layer signaling.

When the CIF is disabled, a PDCCH in a specific DL CC allocates a PDSCH resource in the same DL CC and may also allocate a PUSCH resource in a UL CC linked to the specific DL CC. In this case, a coding scheme, CCE-based resource mapping, a DCI format, and the like identical to those in the legacy PDCCH structure may be applied.

On the other hand, when the CIF is enabled, a PDCCH in a specific DL CC may allocate a PDSCH/PUSCH resource in a single DL/UL CC indicated by the CIF, among a plurality of the aggregated CCs. In this case, the CIF may be additionally defined in the legacy PDCCH DCI format. That is, the CIF may be defined as a field with a fixed length of 3 bits. Alternatively, a CIF position may be fixed regardless of a size of the DCI format. The coding scheme, CCE-based resource mapping, DCI format, and the like of the legacy PDCCH structure may also be applied to this case.

When the CIF exists, an eNB may allocate a DL CC set in which the PDCCH is to be monitored. Accordingly, the burden of blind decoding to a UE may be lessened. The PDCCH monitoring CC set corresponds to a portion of all aggregated DL CCs and the UE may perform PDCCH detection/decoding only in the corresponding CC set. In other words, to perform PDSCH/PUSCH scheduling for a UE, the eNB may transmit the PDCCH only in the PDCCH monitoring CC set. The PDCCH monitoring DL CC set may be configured UE-specifically, UE group-specifically or cell-specifically. For example, when 3 DL CCs are aggregated as shown in the example of FIG. 9, DL CC A may be set as a PDCCH monitoring DL CC. If the CIF is disabled, the PDCCH in each DL CC may schedule only the PDSCH within the DL CC A. On the other hand, if the CIF is enabled, the PDCCH in DL CC A may schedule not only the PDCCH of the DL CC A but also the PDSCH of the other DL CCs. In the case that the DL CC A is set as the PDCCH monitoring CC, the PDCCH may not be transmitted in DL CC B and DL CC C.

Transmission Timing Adjustments

In the LTE system, the amount of time that a signal transmitted from a UE takes to reach an eNB may vary depending on a radius of a cell, a location of the UE in a cell, mobility of the UE, and the like. That is, unless the eNB controls a UL transmission timing of each UE, interference may occur between UEs while each UE communicates with the eNB. Moreover, this may increase an error occurrence rate of the eNB. The amount of time that the signal transmitted from the UE takes to reach the eNB may be referred to as a timing advance. Assuming that a UE is randomly located randomly in a cell, the timing advance from the UE to the eNB may vary depending on a location of the UE. For instance, if the UE is located at the boundary of the cell instead of at the center of the cell, the timing advance of the UE may be increased. In addition, the timing advance may vary depending on a frequency band of the cell. Thus, the eNB needs to be able to manage or adjust transmission timings of UEs in the cell to prevent the interference between UEs. The management or adjustment of transmission timings, which is performed by the eNB, may be referred to as timing advance maintenance or time alignment.

The timing advance maintenance or time alignment may be performed in a random access procedure. During the random access procedure, an eNB may receive a random access preamble from a UE and then calculate a timing advance value using the received random access preamble. The UE may receive the calculated timing advance value through a random access response and then update a signal transmission timing based on the received timing advance value. Alternatively, after receiving an uplink reference signal (e.g., SRS (sounding reference signal) that is transmitted periodically or aperiodically from the UE, the eNB may calculate the timing advance. Thereafter, the UE may update the signal transmission timing based on the calculated timing advance value.

As described above, the eNB may measure UE's timing advance through the random access preamble or the uplink reference signal and then inform the UE of an adjustment value for the time alignment. Here, the adjustment value for time alignment may be referred to as a timing advance command (TAC). The TAC may be processed by a MAC layer. If a UE receives the TAC from the eNB, the UE assumes that the received TAC is valid only for a prescribed time. A time alignment timer (TAT) may be used for indicating the prescribed time. A TAT value may be transmitted to the UE through higher layer signaling (e.g., RRC signaling).

A UE may start transmission of uplink radio frame #i $(N_{TA}+N_{TAoffset}) \times T_s$ seconds before the start of a corresponding downlink radio frame, where $0 \leq N_{TA} \leq 20512$, $N_{TAoffset}=0$ in case of a FDD frame structure, and $N_{TAoffset}=624$ in case of a TDD frame structure. $N_{TA}$ may be indicated by the TAC and $T_s$ represents a sampling time. The UL transmission timing may be adjusted in unit of a multiple of $16T_s$. The TAC may be given as 11 bits in the random access response and it may indicate a value of 0 to 1282. In addition, $N_{TA}$ may be given TA*16. Alternatively, the TAC may be given as 6 bits and it may indicate a value of 0 to 63. In this case, $N_{TA}$ is given as $N_{TA,old}+(TA-31)*16$. The TAC received in subframe n may be applied starting from subframe n+6.

TAG (Timing Advance Group)

In case that a UE use a plurality of serving cells, there may be serving cells having similar timing advance characteristics. For example, serving cells having similar frequency characteristics (e.g. frequency bands) or similar propagation delays may have similar timing advance characteristics. Thus, when carrier aggregation is performed, serving cells having similar timing advance characteristics may be managed as a group to optimize signaling overhead caused by synchronization adjustment of a plurality of uplink timings. Such a group may be referred to as a timing advance group (TAG). Serving cell(s) having similar timing advance characteristics may belong to one TAG and at least one serving cell(s) in the TAG must have uplink resources. For each serving cell, an eNB may inform a UE of TAG allocation using a TAG identifier through higher layer signaling (e.g. RRC signaling). Two or more TAGs may be configured for one UE. If a TAG identifier indicates 0, this may mean a TAG including a PCell. For convenience, the TAG including the PCell may be referred to as a primary TAG (pTAG) and TAG(s) other than the pTAG may be referred to as a secondary TAG (sTAG or secTAG). A secondary TAG identifier (sTAG ID) may be used to indicate an sTAG corresponding to an SCell. If an sTAG ID is not configured for an SCell, the SCell may be configured as a part of pTAG. One TA may be commonly applied to all CCs included in one TA group.

Hereinafter, a description will be given of a structure of TAC MAC CE for transmitting the TAC to a UE.

TAC MAC CE (Timing Advance Command MAC CE)

In the 3GPP LTE system, MAC (medium access control) PDU (protocol data unit) includes a MAC header, a MAC control element (CE), and at least one MAC service data unit (SDU). The MAC header includes at least one sub-header. Each sub-header corresponds to the MAC CE and MAC SDU. The sub-header is used to represent lengths and properties of the MAC CE and MAC SDU.

The MAC SDU is a data block provided from a higher layer (e.g., an RLC layer or an RRC layer) of a MAC layer. The MAC CE is used to deliver control information of the MAC layer such as a buffer status report.

The MAC sub-header includes the following fields
R (1 bit): A reserved field.
E (1 bit): An extended field. It indicates whether there are F and L fields in a next field.
LCID (5 bit): A logical channel ID field. It indicates a type of the MAC CE or a specific logical channel to which the MAC SDU belongs.
F (1 bit): A format field. It indicates whether a next L field has a size of 7 bits or 15 bits.
L (7 or 15 bit): A length field. It indicates a length of the MAC CE or MAC SDU corresponding to the MAC sub-header.

The F and L fields are not included in a MAC sub-header corresponding to a fixed-sized MAC CE.

Figure 10:
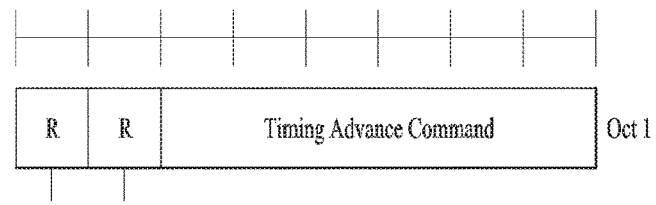
FIG. 10 illustrates a structure of a Timing Advance Command MAC Control Element (TAC MAC CE).

FIG. 6 illustrates TAC MAC CE corresponding to a fixed-sized MAC CE. TAC is used for controlling the amount of time adjustment to be applied to a UE and it is identified by the LCID of the MAC PDU sub-header. Here, the MAC CE has a fixed size and it is configured with a single octet as shown in FIG. 10.

R (1 bit): A reserved field.
TAC (timing advance command) (6 bits): It indicates a $T_A$ index value (e.g., 0, 1, 2, . . . , 63) used for controlling the amount of time adjustment to be applied to a UE.

Although the adjustment value for the time alignment may be transmitted through the TAC, it may be transmitted through a random access response (hereinafter abbreviated as RAR) in response to a random access preamble transmitted from a UE for initial access. Hereinafter, a description will be given of a method of performing a random access procedure proposed for TAC reception.

Random Access Procedure
In the LTE system, a UE can perform a random access procedure in the following cases:
The UE performs initial access without RRC connection with an eNB.
The UE initially accesses a target cell during a handover procedure.
The random access procedure is requested by a command of an eNB.
Data to be transmitted in UL is generated when UL time synchronization is not matched or a dedicated radio resource used for requesting radio resources is not allocated.
A recovery procedure is performed due to radio link failure or handover failure.

Based on the aforementioned description, a general contention-based random access procedure will be described below.

(1) Transmission of First Message
First, the UE may randomly select one random access preamble from a set of random access preambles indicated by system information or a handover command. Thereafter, the UE may transmit the random access preamble by selecting physical RACH (PRACH) resources capable of carrying the random access preamble.

(2) Reception of Second Message
After transmitting the random access preamble, the UE attempts to receive a random access response for the UE within a random access response reception window indicated by the system information or the handover command from the eNB [S904]. In detail, the random access response information may be transmitted in the form of a MAC PDU. The MAC PDU may be transmitted through a physical downlink shared channel (PDSCH). In addition, to appropriately receive information transmitted through the PDSCH, the UE needs to monitor a physical downlink control channel (PDCCH). That is, the PDCCH may contain information of a UE that needs to receive the PDSCH, frequency and time information of radio resources of the PDSCH, a transmission format of the PDSCH, etc. Once the UE successfully receives the PDCCH transmitted to the UE, the UE may appropriately receive the random access response transmitted through the PDSCH based on the information contained in the PDCCH. Moreover, the random access response may include a random access preamble identifier (RAPID), a UL grant indicating a UL radio resource, a temporary C-RNTI, and a timing advance command (TAC).

As described above, the random access response requires the random access preamble ID. This is because, since the random access response may include random access response information for one or more UEs, a UE capable of using the UL grant, the temporary C-RNTI, and the TAC should be indicated. Here, it is assumed that a random access preamble selected by a UE matches a random access preamble ID for the UE. Thus, the UE may receive the UL grant, the temporary C-RNTI, the TAC, etc.

(3) Transmission of Third Message
In case that the UE receives the valid random access response, the UE processes information contained in the random access response. That is, the UE applies the TAC and stores the temporary C-RNTI. In addition, the UE may store data to be transmitted in response to reception of the valid random access response in a message 3 buffer.

The UE transmits the data (i.e., the third message) to the eNB using the received UL grant. The third message needs to contain an ID of the UE. In the contention-based random access procedure, the eNB cannot determine which UE perform the random access procedure and thus the ID of the UE performing the random access procedure need to be included for later contention resolution.

To include the ID of the UE, two methods are discussed. As a first method, if the UE already has a valid cell ID assigned by a corresponding cell prior to the random access procedure, the UE transmits its C-RNTI through a UL transmission signal corresponding to the UL grant. On the other hand, if the UE is not assigned the valid ID prior to the random access procedure, the UE contains its unique ID (e.g., S-TMSI or random ID) in data and transmits the data. In general, the unique ID is longer than the C-RNTI. In case that the UE transmits data corresponding to the UL grant, the UE initiates a contention resolution timer (hereinafter referred to as a CR timer).

(4) Reception of Fourth Message

After transmitting the data including its ID through the UL grant contained in the random access response, the UE stands by an instruction of the eNB for the contention resolution. That is, in order to receive a specific message, the UE attempts to receive the PDCCH [S904]. For the PDCCH reception, two methods are discussed. As described above, when the ID of the UE in the third message, which is transmitted in response to the UL grant, is transmitted using the C-RNTI, the UE attempts to receive the PDCCH using the C-RNTI. When the ID is the unique ID, the UE may attempt to receive the PDCCH using the temporary C-RNTI contained in the random access response. In the former case, if the UE receives the PDCCH through its C-RNTI before the CR timer expires, the UE determines that the random access procedure is normally performed and then completes the random access procedure. In the latter case, if the UE receives the PDCCH through the temporary C-RNTI before the CR timer expires, the UE checks data transmitted through the PDSCH indicated by the PDCCH. If its unique ID is contained in the data, the UE determines that the random access procedure is normally performed and then completes the random access procedure.

Unlike the contention-based random access procedure illustrated in FIG. 7, a non-contention-based random access procedure is completed after transmission of the first message and the second message only. However, before the UE transmits the random access preamble as the first message to the eNB, the UE is assigned the random access preamble from the eNB. Thereafter, the UE transmits the assigned random access preamble as the first message to the eNB and then receives the random access response from the eNB. Thereafter, the random access procedure is completed.

In relation to the present invention, an eNB may trigger a PRACH by a PDCCH command on a PDCCH in order to acquire synchronization. Then, a UE transmits a PRACH preamble to the eNB. For initial synchronization, the UE transmits the PRACH preamble in a contention-based manner. The eNB transmits a Random Access Response message in response to the received first message.

Random Access Response Grant

The higher layer indicates a 20-bit UL Grant to the physical layer. The UL Grant is a Random Access (RA) Response Grant of the physical layer.

The Random Access Response message includes the content of [Table 3] below as well as a TAC. [Table 7] illustrates information included in an RA Response Grant as defined in 3GPP LTE TS 36.213.

TABLE 3

| Content | Number of bits |
| --- | --- |
| Hopping flag | 1 |
| Fixed size resource block assignment | 10 |
| Truncated modulation and coding scheme | 4 |

TABLE 3-continued

| Content | Number of bits |
| --- | --- |
| TPC command for scheduled PUSCH | 3 |
| UL delay | 1 |
| CSI request | 1 |

That is, the 20 bits are configured as follows, from the Most Significant Bit (MSB) to the Least Significant Bit (LSB).

Hopping flag: 1 bit
Fixed size resource block assignment: 10 bits
Truncated Modulation and Coding Scheme (MCS): 4 bits
Transmission Power Control (TPC) command for scheduled PUSCH: 3 bits
UL delay: 1 bit
Channel State Information (CSI) request: 1 bit If a 1-bit Frequency Hopping (FH) field is set to 1 and a UL resource block assignment is type 0 in a corresponding RA Response Grant, a UE performs PUSCH frequency hopping. Otherwise, the UE does not perform PUSCH frequency hopping. If the hopping flag is set, the UE performs PUSCH hopping as indicated by the fixed size resource block assignment field.

The fixed size resource block assignment field will be described below.

First, if the number of UL resource bocks $N^{UL}_{RB} \leq 44$, b LSBs are truncated in the fixed size resource block assignment, and the truncated resource block assignment is interpreted according to the manner of regular DCI format 0. Herein, b is given as [Equation 1].

$$b = \lceil \log_2(N_{RB}^{UL} \cdot (N_{RB}^{UL}+1)/2) \rceil. \quad \text{[Equation 1]}$$

Otherwise, b MSBs set to 0s are inserted after NUP hop hopping bits in the fixed size resource block assignment, and the extended resource block assignment is interpreted in the manner of regular DCI format 0. If the hopping flag is set to 0, the number of hopping bits, NUP hop is 0, and b is given as [Equation 2].

$$b = (\lceil \log_2(N_{RB}^{UL} \cdot (N_{RB}^{UL}+1)/2) \rceil - 10) \quad \text{[Equation 2]}.$$

The truncated MCS field may be interpreted as an MCS corresponding to the RA Response Grant.

The TPC command $\delta_{msg\ 2}$ may be used to set PUSCH power and interpreted according to [Table 2] below.

[Table 2] illustrates the TPC command $\delta_{msg\ 2}$.

TABLE 4

| TPC Command | Value (in dB) |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In a non-contention-based random access procedure, it may be determined from the CSI request field whether an aperiodic CQI, PMI, and RI report is included in a corresponding PUSCH transmission. On the other hand, the CQI request field is reserved in a contention-based random access procedure.

The UL delay field is applied to both TDD and FDD systems. The UL delay field may be set to 0 or 1 to indicate whether a PUSCH delay is introduced.

Case of Plural TAs

Figure 11:
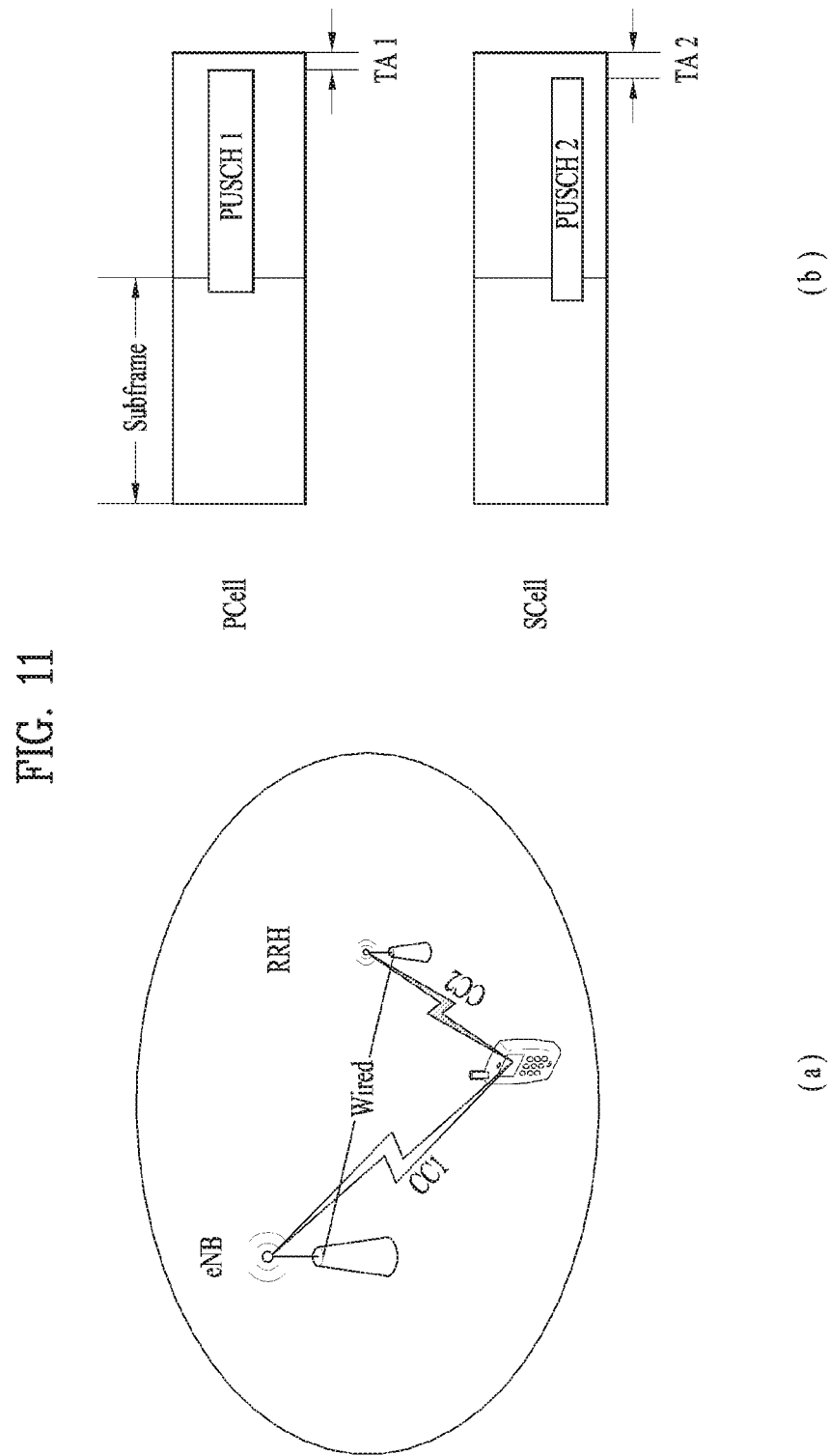
FIG. 11 illustrates an example of aggregation of a plurality of cells having different frequency characteristics.

FIG. 11 illustrates exemplary aggregation of a plurality of cells having different frequency characteristics. In the LTE Release 8/9/10 system, even when a UE aggregates a plurality of CCs, a Timing Advance (TA) value applicable to one CC (e.g., a P cell or a P carrier) is 'commonly' applied to the plurality of CCs, for UL transmission. In the LTE-A system, a UE may be allowed to aggregate a plurality of cells which belong to different frequency bands (i.e., which are greatly spaced from each other in frequency), differ in propagation delay characteristics, or have different coverage. Further, a situation in which Remote Radio Heads (RRHs) such as repeaters are deployed in a specific cell to extend coverage or eliminate a coverage hole may be considered. For example, cells at different locations may be carrier-aggregated (inter-site carrier aggregation). An RRH may be referred to as a Remote Radio Unit (RRU), and an eNB and an RRH (or RRU) may be collectively referred to as a node or a transmission node.

For example, referring to (a) of FIG. 11, a UE may aggregate two cells (cell 1 and cell 2), cell 1 (or CC1) may be configured for direct communication with an eNB without an RRH, and cell 2 may be configured using an RRH for a reason such as limited coverage. In this case, the propagation delay (or a reception timing at the eNB) of a UL signal that the UE transmits in cell 2 (or CC2) may be different from the propagation delay (or a reception timing at the eNB) of a UL signal that the UE transmits in cell 1, according to the location of the UE, frequency characteristics, and the like. If a plurality of cells have different propagation delay characteristics as described above, the cells inevitably have a plurality of TAs.

Meanwhile, (b) of FIG. 11 illustrates a plurality of cells having different TAs. The UE may aggregate two cells (e.g., PCell and SCell) and transmit UL signals (e.g. PUSCHs) by applying different TAs to the cells.

In the case where the UE receives a plurality of TAs, if the gap between the UL transmission timing of a specific cell (e.g., PCell) and the UL transmission timing of another cell is too wide, a method for restricting UL signal transmission in the corresponding cell may be considered. For example, if the gap between the transmission timings exceeds a specific threshold, a method for restricting UL signal transmission in the corresponding cell may be considered. The specific threshold may be set by a higher-layer signal or known to the UE. This operation may be needed to prevent malfunction caused by a UL/DL signal transmission timing relationship between the eNB and the UE which becomes inconstant, if there is a great mismatch between the transmission timings of UL signals transmitted by the UE.

In addition, if the difference between the transmission timings of PUSCHs/PUCCHs in the same subframe in different cells from a single UE is large, the UL signal configuration and DL-UL response time control of the UE may become very complex.

Therefore, if a great mismatch occurs between the UL transmission timings of a plurality of cells due to an independent TA operation, a method for dropping transmission of a UL signal (e.g., a PUSCH, PUCCH, SRS, RACH, or the like) or restricting a UL signal transmission timing may be considered. Specifically, the present invention proposes the following methods.

Method 1)

If the difference between TAs of a plurality of cells in which a UE is supposed to perform UL transmission is equal to or larger than a threshold, the UE may always drop UL transmission in an arbitrary cell so that a TA difference between actually transmitted UL signals may always be within the threshold. In this case, the UE may drop UL signal transmission in a cell with a TA difference exceeding the threshold with respect to a specific cell. More specifically, the specific cell may be a PCell or PCell group. Or the network may indicate the specific cell by RRC signaling or the like. Herein, dropping a UL signal transmission may be an operation for not transmitting a signal pre-configured to be transmitted or not expecting or ignoring a scheduling command for a PUSCH or the like in a cell if the cell has a TA difference exceeding a threshold.

Method 2)

If the difference between TAs of a plurality of cells in which a UE is supposed to perform UL transmission is equal to or larger than a threshold, the UE adjusts the UL transmission timing of an arbitrary cell to be within a TA relative to the transmission timing of another cell. In this case, the UE may adjust the transmission timing of a UL signal in a cell with a TA difference exceeding the threshold with respect to the specific cell. The specific cell may be a PCell or PCell group. Or the network may indicate the specific cell by RRC signaling or the like.

Method 3)

If a UE receives a TAC that results in a TA difference equal to or larger than a threshold between a plurality of cells in which the UE is supposed to perform UL transmission, the UE ignores the TAC or applies the TAC only when the TA difference is within the threshold. In this case, if the UE receives a TAC resulting in a TA difference exceeding the threshold with respect to a specific cell, this method may be applied. The specific cell may be a PCell or PCell group. Or the network may indicate the specific cell by higher-layer signaling (RRC signaling) or the like.

In the foregoing methods, the network may indicate a TA threshold by higher-layer signaling (e.g., RRC signaling) or the like. In addition, a cell may refer to a plurality of cell groups, more characteristically, cell groups to which the same TAC is applied. A TA difference may be the difference between TA values that the UE should apply to transmissions in a specific subframe, the difference between values in a TAC received by the UE, or the difference between transmission timings that the UE will apply to transmissions, as well as the difference between TA values managed by the UE. Further, the method for restricting a TA difference may not be applied to signal transmission to which a TA managed by a TAC value is not applied, like transmission of a PRACH.

Device-to-Device (D2D) Communication

If D2D communication is introduced to the afore-described wireless communication system (e.g., the 3GPP LTE system or the 3GPP LTE-A system), specific methods for conducting D2D communication will be described below.

A brief description will be given of a D2D communication environment used in the present invention.

As its appellation implies, D2D communication is communication between electronic devices. In its broad sense, D2D communication means wired or wireless communication between electronic devices or communication between a human-controlled device and a machine. These days, however, D2D communication typically refers to wireless communication between electronic devices without human intervention.

Figure 12:
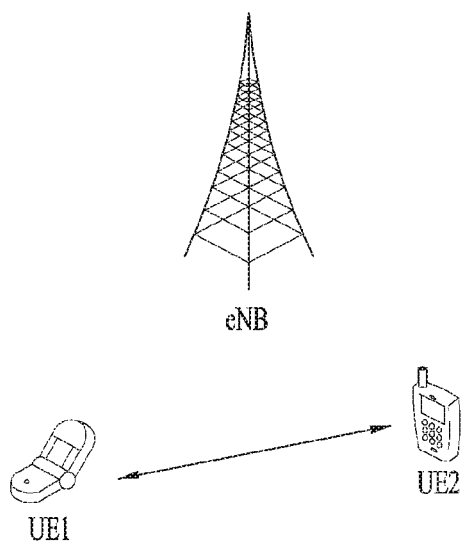
FIG. 12 illustrates an exemplary communication system to which the present invention is applicable.

FIG. 12 is a conceptual view of D2D communication. In FIG. 12, device-to-device communication or UE-to-UE communication is shown as an example of D2D communication, and data may be exchanged between UEs without intervention of an eNB by D2D communication. A link established directly between devices may be referred to as a D2D link. Compared to traditional eNB-centered communication, D2D communication offers the advantages of a shorter latency and the requirement of less radio resources. Although a UE means a user terminal, if a network equipment such as an eNB transmits and receives signals in a UE-to-UE communication scheme, the network equipment may be considered to be a kind of UE.

Although D2D communication supports communication between devices (or UEs) without intervention of an eNB, D2D communication is conducted by reuse of resources of a legacy wireless communication system (e.g., 3GPP LTE/LTE-A) and thus should not interfere with or interrupt the legacy wireless communication system. In the same context, it is also important to minimize interference with D2D communication, caused by a UE, an eNB, or the like operating in the legacy wireless communication system.

Figure 13:
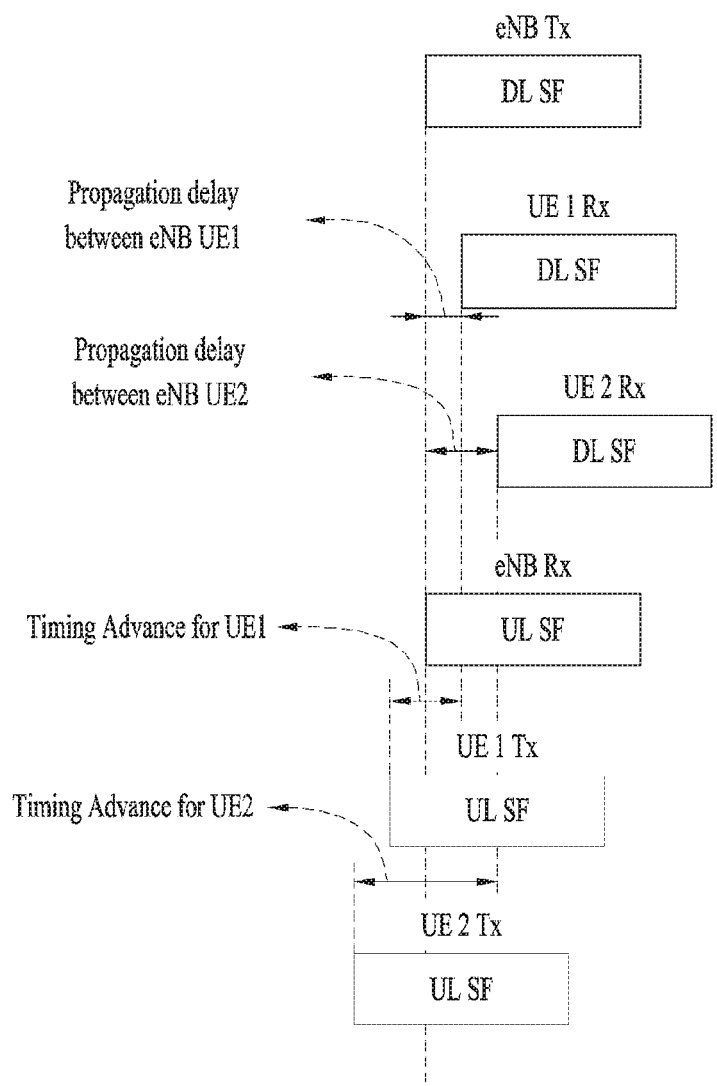
FIG. 13 illustrates exemplary timing advances (TAs) applied to two UEs having different propagation delays.

In general, a D2D signal is transmitted in UL resources. TAs are used so that UE signals at different positions may reach a conventional eNB at the same time point during communication with the eNB. FIG. 13 illustrates exemplary TAs applied to two UEs having different propagation delays. Referring to FIG. 13, TAs are applied to two UEs having different propagation delays with respect to an eNB so that UL signals from the UEs may reach the eNB at the same time.

Meanwhile, a D2D signal is also transmitted and received in UL resources. This is done to mitigate interference by maintaining transmission resources of a UE. D2D signals transmitted by a UE are classified largely into two types. One of the two types is a signal to which a conventional UL TA is applied and for which transmission resources are determined mainly by a direct indication of an eNB, and the other type is a signal which is transmitted without using the conventional UL TA (e.g., a signal transmitted using a specific fixed TA value) and for which transmission resources are determined mainly by an autonomous decision of a UE, not a direct indication of an eNB, or a signal for which although a direct indication of an eNB is applied, a UL TA is not used for active multiplexing with other signals to which a direct indication of the eNB is not applied.

If a UL TA is used for a D2D signal, the D2D signal does not overlap with a legacy UL signal because the D2D signal and the legacy UL signal have the same subframe boundary. On the other hand, if a UL TA is not used for a D2D signal under circumstances, the D2D signal has a different subframe boundary from a legacy UL signal. As a result, the D2D signal transmission may overlap with the legacy UL signal transmission at some time points.

Figure 14:
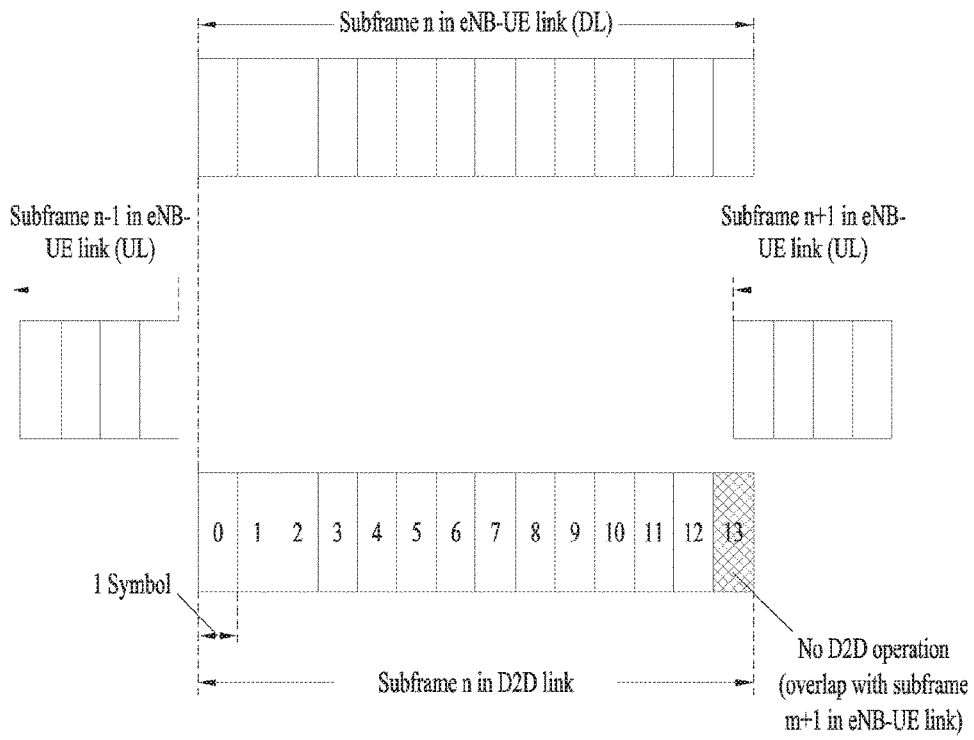
FIG. 14 illustrates exemplary overlap between a Device-to-Device (D2D) signal transmission and a UL signal transmission.

FIG. 14 illustrates an exemplary case in which a D2D signal transmission overlaps with a UL signal transmission. Referring to FIG. 14, if a D2D signal is transmitted with a TA of 0 (TA=0) in subframe n, the D2D signal overlaps with a UL signal in subframe n+1 to which a TA larger than 0 (i.e., TA>0) is applied. In this case, to ensure the UL signal transmission in subframe n+1, the last symbol of subframe n may be set as a gap or a guard period so that D2D transmission may not take place. While a D2D signal gap is shown in FIG. 14 as set at the end of a D2D subframe, if subframe n+1 is also a D2D subframe, the signal gap may be omitted in subframe n. In this case, D2D transmissions in two consecutive subframes may be considered to be one D2D transmission and it may be interpreted that a signal gap appears only at the end of the one D2D transmission.

As described before, a D2D signal gap is needed only when a UL signal transmission may occur. For example, if a specific UE transmits a D2D signal outside eNB coverage, there is no need for configuring a D2D gap because no UL signal is transmitted in a subsequent subframe.

While a receiving UE needs to determine whether the D2D signal is transmitted inside or outside the eNB coverage, if the coverage state of each individual UE is indicated to other UEs, signaling overhead may be too much. However, information indicating whether a corresponding D2D signal has been transmitted inside or outside coverage may be derived from a D2D Synchronization Signal (D2DSS) transmitted for time/frequency synchronization of a D2D signal or a D2D Synchronization Channel (D2DSCH) carrying various types of synchronization information. A transmitting UE may transmit a D2DSS/D2DSCH to enable other UEs to acquire synchronization with its transmission signal. A different D2DSS/D2DSCH may be transmitted according to the coverage state of the transmitting UE. For example, the transmitting UE may use a different set of D2DSS sequences depending on whether a D2DSS is generated inside or outside an eNB. The receiving UE may determine whether a specific D2DSS has been originated inside the eNB based on the different D2DSS sequence sets and synchronize with a D2DSS, considering that a D2DSS originated inside the eNB is more stable and thus giving priority to the D2DSS.

To extend D2DSS coverage, a UE may relay a D2DSS. For example, even though a specific UE is located outside the coverage, if the corresponding UE detects a D2DSS used inside the coverage, the corresponding UE may synchronize with the D2DSS and transmit the D2DSS in turn.

In this case, if another UE synchronizes with the D2DSS generated inside the coverage and receives a D2D signal accordingly, the D2DSS may have been transmitted from a UE inside the eNB coverage or relayed by a UE outside the eNB coverage. Therefore, there are limitations in accurately indicating the coverage state of a transmitting UE. In this case, it is proposed for a more stable operation that if a receiving UE determines that a D2DSS by which synchronization is acquired has been generated inside eNB coverage, every D2D signal based on the synchronization always has a gap at the end. Meanwhile, if the receiving UE determines that a D2DSS by which synchronization is acquired has been generated from a UE outside the eNB coverage, it is proposed that the receiving UE operates on the assumption that a gap is not used at the end of the D2D signal because obviously, no UL signal transmission follows the D2D signal.

To this end, even though the transmitting UE is outside the coverage, if a D2DSS/D2DSCH serving as a transmission reference has been generated from a UE inside the eNB, the transmitting UE may configure a D2D gap at the end of a D2D transmission signal. On the contrary, if the D2DSS/D2DSCH serving as a transmission reference has been generated from a UE outside the eNB (or the transmitting UE relays the D2DSS/D2DSCH generated from the UE outside the eNB), the transmitting UE may not configure a D2D gap at the end of the D2D transmission signal.

Hereinbelow, a UE operation for transmitting a D2D signal related to an SRS will be described.

An SRS is a signal that an eNB commands a UE to transmit, in order to acquire channel information about a UL signal. The SRS is transmitted in the last symbol of a UL subframe in an LTE system. This structure is related to the afore-described D2D signal gap in that the SRS is transmitted in the last symbol of a subframe. If SRS transmission in subframe n is indicated by higher-layer signaling and thus a D2D subframe overlaps with a UL subframe carrying an SRS, whether a UE may perform the D2D transmission and what operation to be performed if the UE is allowed to perform the D2D transmission are yet to be specified. A D2D operation of a UE in the case where an SRS is configured may be described in consideration of whether a TA is applied or not, a used Cyclic Prefix (CP), and whether the SRS is cell-specific or UE-specific A. Embodiment 1

To protect the SRS transmission possibility of other UEs, the case of a cell-specific SRS configured by an eNB will first be described. Upon receipt of a cell-specific SRS configuration, a UE may be aware that another UE is probable to transmit an SRS in the last symbol of a subframe included in the cell-specific SRS configuration.

Now, a description will be given of a UE operation according to whether a specific UE uses a UL TA or not. The case where a specific UE uses a UL TA will first be described.

In the case where a specific UE transmits a D2D signal with a UL TA in a specific subframe, if the specific subframe is included in a cell-specific SRS configuration, the UE may protect SRS transmission of another UE by setting a gap in the last symbol of the specific subframe. Or to ensure as much D2D signal resources as possible, the UE may transmit a D2D signal without a D2D signal gap irrespective of the cell-specific SRS configuration. Or to prevent a malfunction that may occur when UEs of another cell do not have knowledge of the cell-specific SRS configuration, the UE may always set a gap at the end of each subframe even when a D2D signal uses a UL TA.

On the other hand, in the case where a specific UE transmits a D2D signal without using a UL TA in a specific subframe, the specific UE may operate as follows.

If a specific UE transmits a D2D signal without using a UL TA in a specific subframe, the specific UE may drop the whole D2D signal transmission in the subframe. Specifically, if the subframe is included in the cell-specific SRS configuration, the specific UE may operate in a manner that protects SRS transmission of another UE. However, the problem with this case is a mismatch between a D2D subframe boundary and a UL subframe boundary. That is, while a cell-specific SRS is configured at a position corresponding to the last symbol from the perspective of a UL subframe, the cell-specific SRS is placed at a different position from the perspective of a D2D subframe. Thus, there may be a mismatch between the SRS and a D2D signal gap. In this case, it may be impossible to maintain a regular D2D subframe structure with a D2D signal gap which is set only in the last symbol. Therefore, if the corresponding subframe is included in the cell-specific SRS configuration in this situation, that is, in the case where a UE transmits a D2D signal without using a UL TA, the UE may drop the whole D2D signal transmission in the subframe. Particularly, dropping the D2D signal transmission may be more preferable when the UE transmits a D2D message across one whole subframe.

This operation is different in that D2D transmission is discontinued for protection of SRS transmission, additionally in a subframe available for SRS transmission of another UE, beyond the principle that when a regular UL signal overlaps with a D2D signal, D2D transmission is discontinued and the UL signal is transmitted.

On the contrary, if a signal such as a D2DSS is transmitted particularly in a part of the symbols of a subframe, the transmission may be performed as far as it does not overlap with the last symbol in the cell-specific SRS configuration.

Exceptionally, if a TA value of the UE is so small that the difference between a D2D subframe boundary and a UL subframe boundary is within a predetermined value (e.g., a CP length or a predetermined threshold), the UE may transmit a D2D signal in the remaining symbols of a subframe except for the last symbol corresponding to a D2D signal gap, considering that the UL subframe boundary matches the D2D subframe boundary.

Or the principle that if a cell-specific SRS overlaps with a D2D subframe that does not use a UL TA, D2D transmission is discontinued may be generalized so that it may be regulated that if a specific D2D subframe overlaps with a cell-specific SRS configuration irrespective of use or non-use of a UL TA, D2D transmission is discontinued. In this case, there is no need for an operation for processing a cell-specific SRS configuration according to whether a UL TA is used, thereby simplifying UE implementation and system operations.

Eventually, the foregoing methods are common in that a UE should determine whether a D2D subframe overlaps with a cell-specific SRS subframe and perform an appropriate operation according to the determination. To avoid the complexity of this operation, it may be regulated that an eNB configures subframes so appropriately as not to overlap a D2D subframe with a cell-specific SRS subframe. Especially when a D2D subframe does not use a UL TA, it may be regulated that the eNB configures subframes so appropriately as not to overlap the D2D subframe not using a UL TA with a cell-specific SRS subframe.

B. Embodiment 2

A description will be given of a UE-specific SRS configuration that an eNB transmits to instruct SRS transmission to a UE. Upon receipt of the UE-specific SRS configuration, the UE transmits its SRS in the last symbol of a corresponding subframe.

A case where a D2D signal is transmitted using a UL TA in a specific subframe will first be described. In the case where a specific UE transmits a D2D signal using a UL TA in a specific subframe, if the subframe is included in a UE-specific SRS configuration, the UE may transmit an SRS, discontinuing the D2D transmission in the last symbol.

On the other hand, in the case where a specific UE transmits a D2D signal without using a UL TA in a specific subframe, the specific UE may operate as follows. In the case where a specific UE transmits a D2D signal without using a UL TA in a specific subframe, if the subframe is included in a UE-specific SRS configuration, the UE transmits an SRS. However, since there may be a mismatch between a UL subframe boundary and a D2D subframe boundary as described before, the UE may drop the D2D transmission in the whole subframe and transmit only the SRS.

However, if a D2D signal uses only a part of the symbols of a subframe, like a D2DSS, the UE may transmit the D2DSS as far as the symbols carrying the D2DSS do not overlap with an SRS transmission symbol.

Exceptionally, if a TA value of the UE is so small that the difference between a D2D subframe boundary and a UL subframe boundary is within a predetermined value (e.g., a CP length or a predetermined threshold), the UE may transmit a D2D signal in the remaining symbols of a subframe except for the last symbol corresponding to a D2D signal gap, and the SRS in the last symbol, considering that the UL subframe boundary matches the D2D subframe boundary.

Or the principle that if a UE-specific SRS overlaps with a D2D subframe that does not use a UL TA, D2D transmission is discontinued may be generalized so that it may be regulated that if a specific D2D subframe overlaps with a UE-specific SRS configuration irrespective of use or non-use of a UL TA, D2D transmission is discontinued. In this case, there is no need for an operation for processing a UE-specific SRS configuration according to whether a UL TA is used, thereby simplifying UE implementation and system operations.

Eventually, the foregoing methods are common in that a UE should determine whether a D2D subframe overlaps with a UE-specific SRS subframe and perform an appropriate operation according to the determination. To avoid the complexity of this operation, it may be regulated that an eNB configures subframes so appropriately as not to overlap a D2D subframe with a UE-specific SRS subframe. Especially when a D2D subframe does not use a UL TA, it may be regulated that the eNB configures subframes so appropriately as not to overlap the D2D subframe not using a UL TA with a UE-specific SRS subframe.

C. Embodiment 3

A case where a D2D subframe and an SRS subframe having different CPs collide will be descried in detail. Since a D2D signal and a WAN signal including an SRS directed to an eNB differ in coverage and time synchronization level between UEs, CPs may be used independently for the D2D signal and the WAN signal. A processing method for the case where a D2D subframe overlaps with an SRS subframe at a specific time point may be different in the case of different CPs (or CP lengths) from in the case of the same CP (or CP length). Even in this case, the description of a UE operation performed according to whether a UL TA is used or not is applicable.

Case 1) The CP of a D2D subframe is an extended CP, the CP of an SRS subframe is a normal CP, and a corresponding subframe is included only in a cell-specific SRS configuration.

Case 1-1) A D2D signal uses a UL TA.

Figure 15:
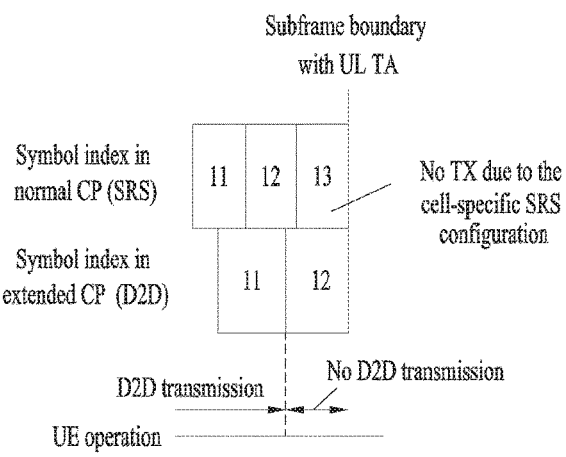
FIG. 15 illustrates an embodiment of a D2D operation of a UE according to a Cyclic Prefix (CP).

FIG. 15 is a view depicting a UE operation in Case 1-1. Referring to FIG. 15, since the last symbol with an extended CP covers the whole last symbol with a normal CP in this case, a regular SRS may be configured. That is, a UE may discontinue D2D transmission in the last symbol of a cell-specific SRS subframe, thus protecting SRS transmission from another UE.

Case 1-2) A D2D signal does not use a UL TA.

Figure 16:
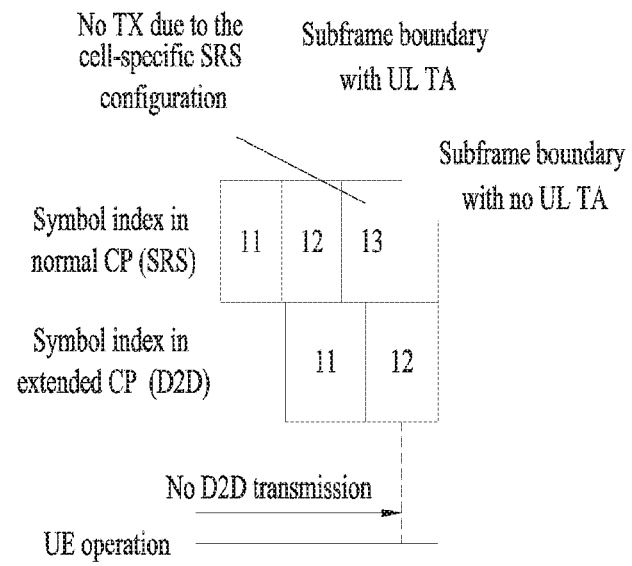
FIG. 16 illustrates another embodiment of a D2D operation of a UE according to a CP.

FIG. 16 is a view depicting a UE operation in Case 1-2) according to another embodiment of the present invention. Referring to FIG. 16, even though one symbol with the extended CP is longer than one symbol with the normal CP, an operation for emptying the last symbol according to a UL TA may affect another D2D signal due to a mismatch between subframe boundaries. In this case, the whole D2D signal transmission may be dropped in a corresponding subframe. Particularly, the transmission dropping may be more preferable when a UE transmits a D2D message over an entire subframe.

On the contrary, if a signal such as a D2DSS is transmitted particularly only a part of the symbols of a subframe, the D2D transmission may be performed as far as it does not overlap with the last symbol in a cell-specific SRS configuration.

Figure 17:
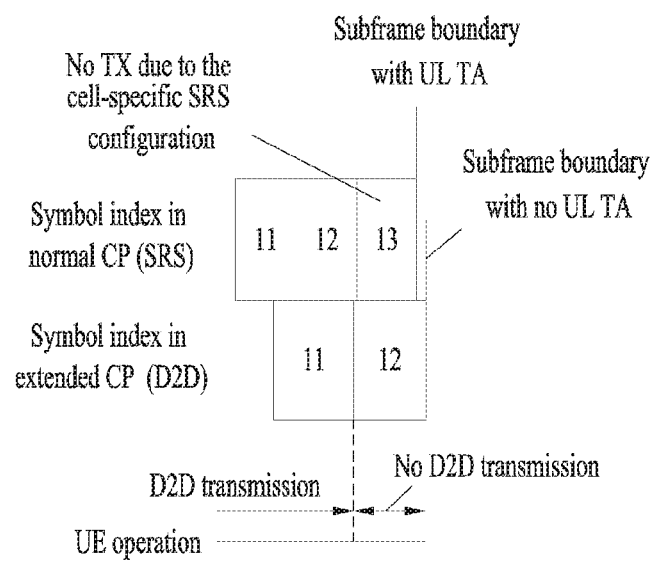
FIG. 17 illustrates another embodiment of a D2D operation of a UE according to a CP.

Exceptionally, a TA value of the UE is so small that the difference between a D2D subframe boundary and a UL subframe boundary may be within a predetermined value (e.g., a CP length or a predetermined threshold). FIG. 17 is a view depicting a UE operation in this case according to an embodiment of the present invention. Referring to FIG. 17, the UE may transmit a D2D signal in the remaining symbols of a subframe except for the last symbol corresponding to a D2D signal gap, considering that the UL subframe boundary still matches the D2D subframe boundary.

In this case, the start of the last symbol with the normal CP to which a small UL TA is applied is later than the start of the last symbol with the extended CP to which a UL TA is not applied. Therefore, the UE may discontinue transmission of the last D2D symbol with the extended CP, thereby protecting SRS transmission of another UE. In another sense, it may be interpreted that D2D transmission is dropped in a corresponding subframe, only when the start of the last symbol with the normal CP to which a UL TA is applied is later than the start of the last symbol with the extended CP to which a UL TA is not applied.

Case 2) A D2D subframe has a normal CP, an SRS subframe has an extended CP, and a corresponding subframe is included only in a cell-specific SRS configuration.

Figure 18:
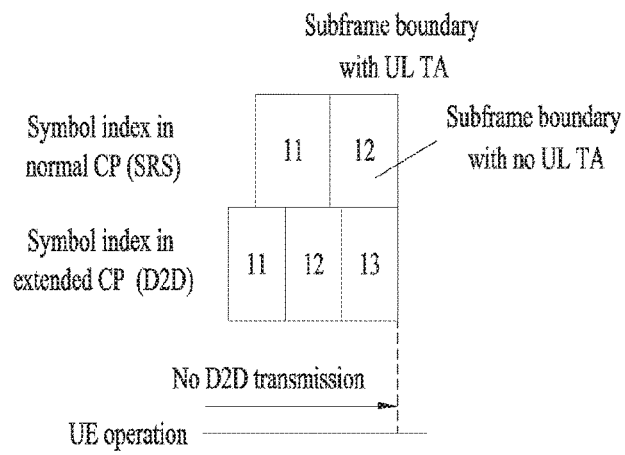
FIG. 18 illustrates another embodiment of a D2D operation of a UE according to a CP.
Figure 19A:
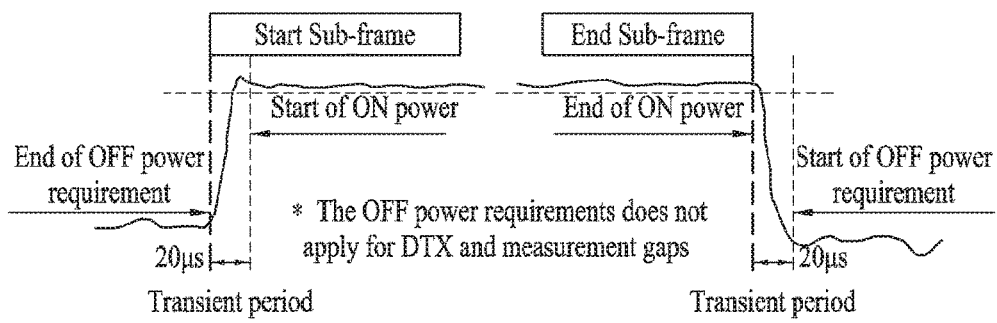
Figure 19B:
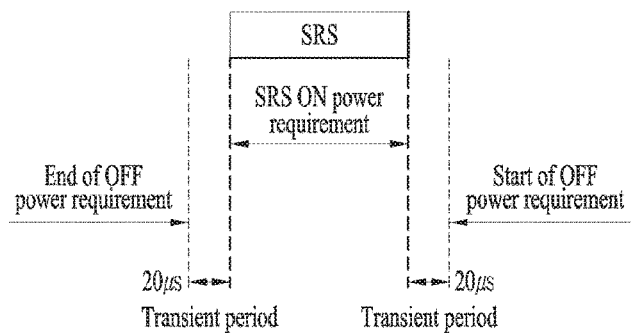
Figure 19C:
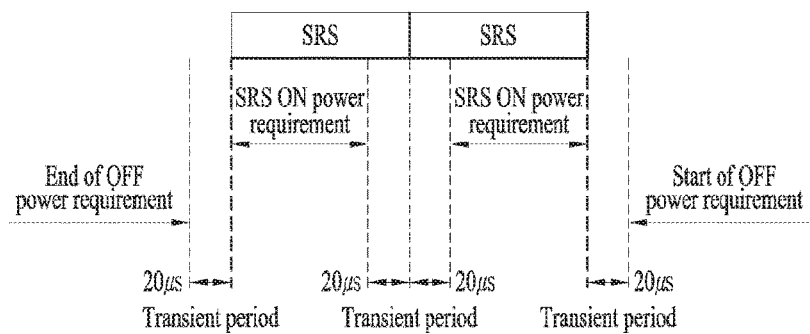
Figure 19D:
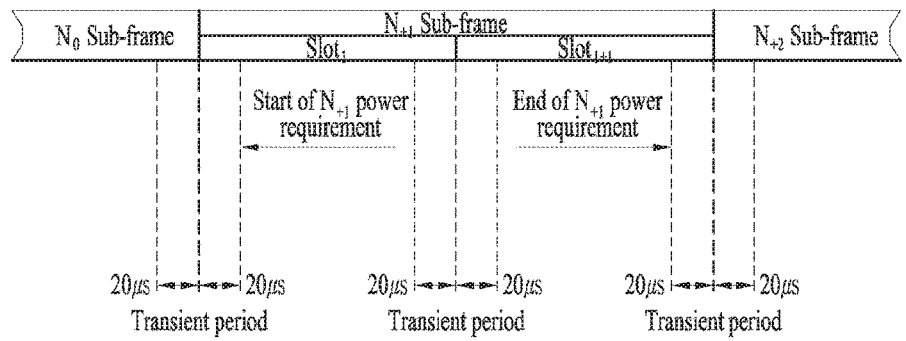
Figure 19E:
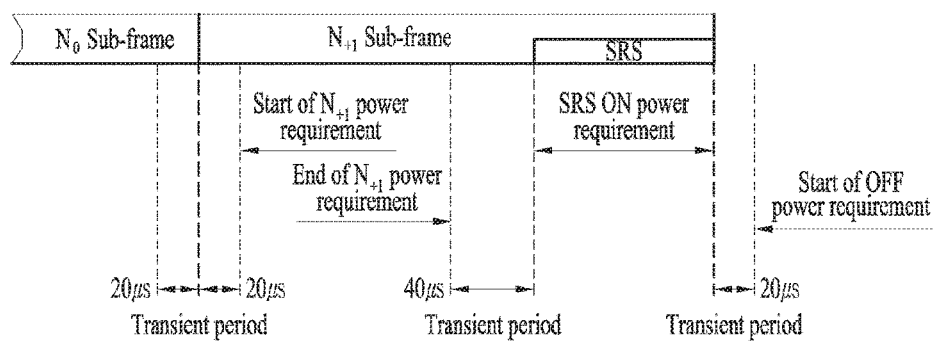
Figure 19F:
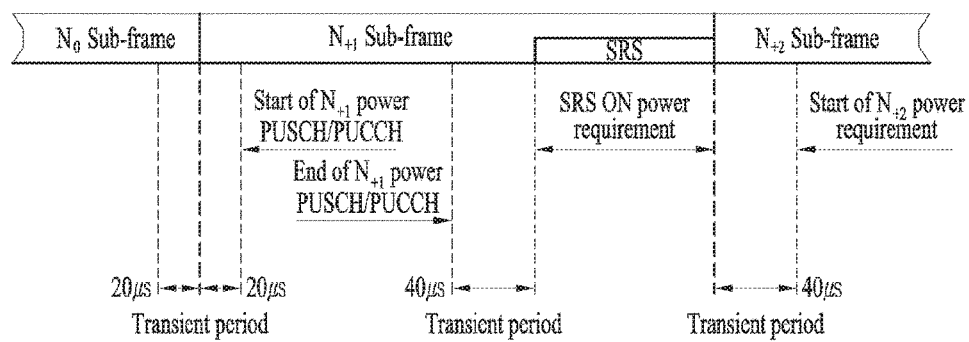
Figure 19G:
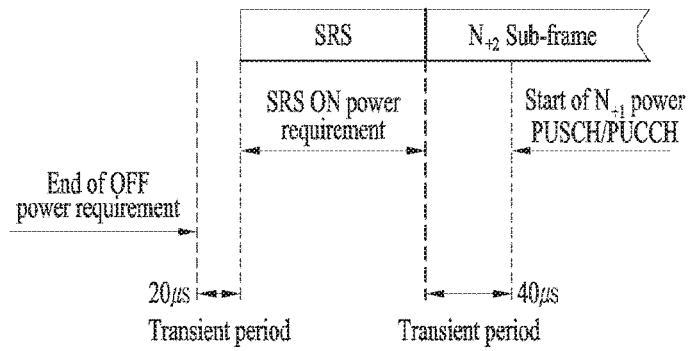
Figure 19H:
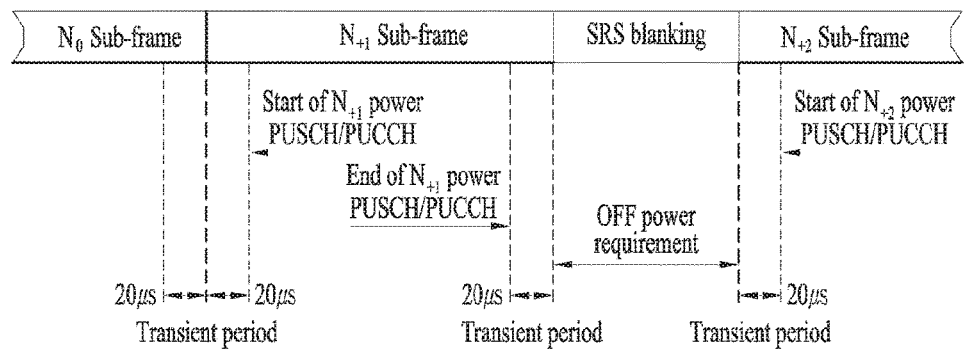

FIG. 18 is a view depicting a UE operation in Case 2) according to another embodiment of the present invention. In this case, even though a UE uses a UL TA, the last extended-CP symbol starts before the last normal-CP symbol and thus an SRS of another UE may not be protected perfectly. That is, the start of the last symbol of the SRS subframe is earlier than the start of the last symbol of the D2D subframe. In this case, the whole D2D transmission may be dropped in the corresponding subframe, as illustrated in FIG. 18.

If UE implementation becomes excessively complex due to different operations in Cases 1-1), 1-2), and 2), for operation simplicity, if a D2D subframe and an SRS subframe have different CPs, a UE may be configured to always discontinue D2D transmission in an entire subframe indicated by a cell-specific SRS configuration irrespective of use of non-use of a UL TA and/or a used CP (or CP length). Or if the CPs (or CP lengths) are the same, an SRS signal and a D2D signal may be transmitted, and otherwise, the D2D transmission may be discontinued (or the whole D2D transmission may be dropped). However, even in this case, the SRS transmission and the D2D transmission may be performed only when a TA is used, and otherwise, the D2D transmission may be discontinued (or the whole D2D transmission may be dropped). In this case, UE implementation and system operations are advantageously simplified because there is no need for an operation for processing a cell-specific SRS configuration according to use or non-use of a UL TA and/or a CP (or CP length).

Obviously, a signal transmitted only in partial symbols, such as the afore-described D2DSS may be exceptional.

In the above-described methods, a UE should determine whether a D2D subframe overlaps with a cell-specific SRS subframe and perform an appropriate operation according to the determination. To avoid the complexity of the above operation, it may be regulated that an eNB configures subframes such that a D2D subframe may not overlap with a cell-specific SRS subframe. Particularly, when a D2D subframe and an SRS subframe have different CPs, the eNB may configure subframes appropriately so that the D2D subframe may not overlap with the cell-specific SRS subframe.

Case 3) A D2D subframe has an extended CP, an SRS subframe has a normal CP, and the SRS subframe is included in a UE-specific SRS configuration.

Case 3-1) A D2D signal uses a UL TA.

In this case, since the last symbol with the extended CP may cover the last symbol period with the normal CP, a regular SRS may be configured. That is, for a UE-specific SRS subframe, the UE may discontinue D2D transmission in the last symbol of a D2D subframe, change the CP length, and then transmit its SRS.

Case 3-2) A D2D signal does not use a UL TA.

In this case, even though one symbol with the extended CP is longer than one symbol with the normal CP, transmission of an SRS in the last symbol according to the UL TA may affect transmission of another D2D signal at the corresponding position due to a mismatch between an SRS subframe boundary and a D2D subframe boundary. Accordingly, the whole D2D signal transmission may be dropped in the corresponding subframe in this case, as described before. Particularly, the transmission dropping may be more preferable when the UE transmits a D2D message over an entire subframe.

On the contrary, if a signal such as a D2DSS is transmitted particularly in a part of the symbols of a subframe, the transmission may be performed as far as it does not overlap with the last symbol in the cell-specific SRS configuration.

Exceptionally, if a TA value of the UE is so small that the difference between a D2D subframe boundary and a UL subframe boundary is within a predetermined value (e.g., a CP length or a predetermined threshold), the UE may transmit a D2D signal in the remaining symbols of a subframe except for the last symbol corresponding to a D2D signal gap, considering that the UL subframe boundary matches the D2D subframe boundary.

Case 4) A D2D subframe has a normal CP, an SRS subframe has an extended CP, and a specific subframe is included in a UE-specific SRS configuration.

In this case, although the UE uses a UL TA, the last symbol of the extended-CP subframe starts before the last symbol of the normal-CP subframe starts. Therefore, the UE may not transmit an SRS successfully. That is, if the last symbol of the SRS subframe starts before the start of the last symbol of the D2D subframe, the UE may drop the whole D2D transmission in the corresponding subframe.

If UE implementation becomes excessively complex due to different operations in Cases 3-1), 3-2), and 4), for operation simplicity, if a D2D subframe and an SRS subframe have different CPs, a UE may be configured to always discontinue D2D transmission in an entire subframe indicated by a UE-specific SRS configuration irrespective of use of non-use of a UL TA and/or a used CP (or CP length). That is, if the CPs are the same, an SRS signal and a D2D signal may be transmitted, and otherwise, the D2D transmission may be discontinued (or the whole D2D transmission may be dropped). However, even in this case, an SRS signal and a D2D signal may be transmitted only when a TA is used, and otherwise, the D2D transmission may be discontinued (or the whole D2D transmission may be dropped).

Obviously, a signal transmitted only in partial symbols, such as the afore-described D2DSS may be exceptional.

In the above-described methods, a UE should determine whether a D2D subframe overlaps with a UE-specific SRS subframe and perform an appropriate operation according to their CPs. To avoid the complexity of the above operation, it may be regulated that an eNB configures subframes such that a D2D subframe may not overlap with a UE-specific SRS subframe. Particularly, when a D2D subframe and an SRS subframe have different CPs, the eNB may configure subframes appropriately so that the D2D subframe may not overlap with the UE-specific SRS subframe.

Meanwhile, an SRS may be configured only in some RBs, not total RBs of one subframe. Therefore, the afore-described collision between a D2D subframe and an SRS subframe may be confined to a case in which a part or all of RBs carrying a D2D signal are included in the RBs in which the SRS is configured. Or to avoid the complexity of comparing an SRS RB configuration with a D2D RB configuration and performing a different operation according to the comparison in each situation by a UE, the collision problem may be solved uniformly by applying the above-described methods, if a D2D subframe overlaps with an SRS subframe even though the D2D RBs do not overlap with the SRS RBs.

If a rule for an eNB operation is defined according to the foregoing method, a UE operation may be designed on the assumption that the eNB performs an appropriate configuration according to the rule.

Hereinbelow, a detailed description will be given of overlap with a D2D transmission symbol with a symbol in which a cell-specific or UE-specific SRS is configured.

FIG. 19 is a view depicting an ON/OFF time mask applicable to the present invention. Referring to FIG. 19, an ON/OFF time mask will be described.

ON/OFF Time Mask

A transmitter needs a predetermined time to turn off output power as well as to turn on the output power. This means that output power is not immediately turned on and turned off. Moreover, sudden transitions between the ON state and the OFF state may cause emission of unintended signals in adjacent carriers causing adjacent channel interference, and these signals should be limited to a specific level. Therefore, a transient period exists, during which the transmitter switches between the OFF state and the ON state. In addition, a different power allocation is configured on a subframe basis according to a physical layer channel (or signal) such as a PUSCH, a PUCCH, or an SRS on UL, and a transient period also exists when there is a power difference between consecutive channels.

(a) of FIG. 19 illustrates an exemplary general ON/OFF time mask.

Referring to (a) of FIG. 19, a general ON/OFF time mask is defined as an interval observed when output power is turned on from OFF power to ON power and an interval observed when output power is turned off from ON power to OFF power. This ON/OFF time mask may be generated in a Discontinued Transmission (DTX) period, a measurement gap, and the start or end of an adjacent/non-adjacent transmission.

An OFF power measurement period is defined as at least one subframe interval except for a transient period. In addition, ON power is defined as the average power of one subframe except for a transient period. While OFF power and ON power requirements should be satisfied respectively during an OFF power period and an ON power period, no requirement for UL transmission power is not defined for a transient period.

While the following description is given on the assumption that 20 us is taken for an ON-OFF transient period, this is a maximum allowed duration and ON-OFF transition may occur faster depending on UE implementation.

(b) of FIG. 19 illustrates an exemplary single SRS time mask, and (c) of FIG. 19 illustrates exemplary dual SRS time masks.

Referring to (b) of FIG. 19, a 20-μs transient period is set between an SRS symbol (an SRS ON power period) and an OFF power period. In the case of a single SRS transmission, SRS ON power is defined as the average power of a symbol period for SRS transmission, and should satisfy an SRS ON power requirement.

On the other hand, referring to (c) of FIG. 19, in the case of dual SRS transmissions (e.g., UpPTS transmission), a 20-μs transient period is set between each of dual SRS symbols and an OFF power period. The transient periods set between the dual SRS symbols are applicable only when frequency hopping is applied or transmission power is changed between the dual SRS symbols. In the case of dual SRS transmissions, SRS ON power is defined as the average power of each symbol period for SRS transmission except for the transient period, and should satisfy an SRS ON power requirement.

(d) of FIG. 19 illustrates an exemplary time mask at a slot/subframe boundary.

Referring to (d) of FIG. 19, a subframe boundary time mask is defined as an interval observed between a previous or following subframe and a (reference) subframe. In the example illustrated in (d) of FIG. 19, 40-μs transient periods (20 μs+20 μs) are set between subframe N0 and subframe $N_{+1}$ and between subframe $N_{+1}$ and subframe $N_{+2}$. A transient period at a slot boundary in a subframe is set only in the case of intra-subframe frequency hopping, and 20 μs is set at each of both sides of a slot boundary.

However, if a subframe includes an SRS time mask, a different ON/OFF time mask may be defined, which will be described below with reference to (e) of FIG. 19 to (h) of FIG. 19.

(e) of FIG. 19 to (h) of FIG. 19 illustrate exemplary PUCCH/PUSCH/SRS time masks.

(e) of FIG. 19 illustrates an exemplary PUCCH/PUSCH/SRS time mask for the case where there is a transmission before an SRS symbol and there is no transmission after the SRS symbol. In this case, a 40-μs transient period (20 μs+20 μs) is set between PUSCH/PUCCH symbols and the SRS transmission symbol, and a 20-μs transient period is set from the start of the next subframe because there is no UL transmission in the subframe following subframe N+1.

(f) of FIG. 19 illustrates an exemplary PUCCH/PUSCH/SRS time mask for the case where there is transmissions before and after an SRS symbol. In this case, a 40-μs transient period (20 μs+20 μs) is set between PUSCH/PUCCH symbols and the SRS transmission symbol, and a 40-μs transient period is set after the SRS symbol because there is a UL transmission in the subframe following the SRS symbol (subframe N+2).

(g) of FIG. 19 illustrates an exemplary PUCCH/PUSCH/SRS time mask for the case where there is no transmission before an SRS symbol and there is a transmission after the SRS symbol. In this case, a 20-μs transient period is set between the SRS transmission symbol and an OFF power period, and a 40-μs transient period is set after the SRS symbol because there is a UL transmission in the subframe following the SRS symbol (subframe N+2).

(h) of FIG. 19 illustrates an exemplary SRS time mask in the presence of SRS blanking in an FDD system. In the presence of SRS blanking, 20-μs transient periods are set before and after SRS blanking, in spite of UL transmissions before and after SRS blanking.

As described before, a PUCCH/PUSCH/SRS time mask is defined as an interval observed between an SRS symbol and an adjacent PUSCH/PUCCH symbol and an interval observed between the SRS symbol and an adjacent subframe.

In intra-band contiguous CA, the afore-described general output power ON/OFF time mask may be applied on a CC basis during an ON power period and a transient period. The afore-described OFF period may be applied on a CC basis only when all CCs are OFF.

As described above, when a UE switches between transmission and reception, the UE needs a predetermined transient period. For example, referring to (a) of FIG. 19, the UE has transient periods each having a predetermined duration (20 μs at maximum) before and after an SRS symbol to stably maintain UE transmission power in an SRS symbol period.

In addition, if parameters transmitted by the UE (e.g., RB position, transmission power, and the like) are different between two transmissions, a transient period is also required. For example, referring to (f) of FIG. 19, the UE may prepare for SRS transmission that may have a different parameter by setting a transient period having a predetermined duration (40 μs at maximum) after a PUSCH/PUCCH transmission. Considering that up to 20 μs is required to transition from a PUSCH/PUCCH transmission to an OFF state and up to 40 μs is required to transition from an SRS transmission to an OFF state, the maximum transient period is doubled.

Referring to (h) of FIG. 19, similarly in the case where only a cell-specific SRS is configured, the UE operates to maintain OFF power by setting a transient period in the vicinity of an SRS that the UE does not transmit.

In general, since different parameters are used for D2D transmission and SRS transmission (SRS transmission includes an OFF state in which an SRS is transmitted with zero power, that is, the SRS is not transmitted), "overlap between D2D transmission and an SRS symbol" may be interpreted in consideration of a transient period in performing the above-described operation in the present invention.

For example, on the assumption of the following situation, "overlap between D2D transmission and an SRS symbol" may mean the following operation. If it is assumed that D2D transmission and SRS transmission are performed at the same UL timing and have the same CP, the time masks illustrated in (b) of FIG. 19 to (h) of FIG. 19 are used, and PUSCH/PUCCH transmission may be replaced with D2D transmission, the overlap may mean the following operation.

1) In the case where a cell-specific SRS is configured in the last symbol of a D2D transmission subframe, the UE should maintain the OFF state from the position of an SRS symbol, setting a transient period before the SRS symbol. The UE should maintain normal D2D transmission power until 20 us before the start of the SRS symbol.

2) In the case where a cell-specific SRS is configured in the last symbol of a D2D transmission subframe, the UE should maintain the ON state from the position of an SRS symbol, setting a transient period before the SRS symbol. The UE should maintain normal D2D transmission power until 40 us before the start of the SRS symbol.

FIG. 20 is a view depicting a relationship between a transient period and overlap, which is applicable to an embodiment of the present invention.

In the case where a cell-specific SRS is configured in the last symbol of a D2D transmission subframe, if a transient period required for the UE to switch from ON to OFF is X(us), this may imply that if the ending symbol of a D2D signal overlaps with the starting symbol of an SRS over (20-X)(us) or less, the symbols are regarded as not overlapping with each other. As illustrated in FIG. 20, this is because if the UE performs D2D transmission until 20 us before the ending symbol of the D2D signal and then transitions to the OFF state during X(us), the SRS symbol may start and the UE may maintain the OFF state from the start of the SRS symbol. Obviously, a maximum allowed duration of a transient period may be set to a value other than 20 us, and may vary with the types and sequence of signals transmitted by the UE, as described before.

Referring to FIG. 20, if a D2D transmission symbol overlaps with an SRS symbol, it may imply that the remaining period of a maximum transient period allowed for a given situation except for an overlapped period gets shorter than a transient period that the UE requires to transition to an operation needed in the SRS symbol, and thus the UE may not perform a normal operation from the start of the SRS symbol. The normal operation may refer to an operation for maintaining the OFF state when only a cell-specific SRS is configured. If a UE-specific SRS is configured, the normal operation may refer to an operation for maintaining the ON state according to an SRS parameter.

Now, a description will be given of specific methods for discontinuing D2D transmission, when a problem occurs due to overlap between a D2D subframe and an SRS subframe.

Method 1) The D2D transmission may be discontinued in all D2D symbols of a subframe to which a problem occurs. As described before, a signal transmitted in a part of the symbols of a subframe, like a D2DSS may be exceptional.

Method 2) The UE may discontinue the D2D transmission only in problematic D2D symbols. Since the D2D transmission may be continued in normal symbols, this method may advantageously maintain the D2D transmission using the normal symbols only. In this case, however, a receiving UE should have the function of additionally determining symbols in which D2D transmission is discontinued. For example, the UE may attempt to detect reception power on a D2D symbol basis.

Method 3) The UE may transmit a D2D signal until before a first problematic D2D symbol, to thereby ensure continuity in the D2D transmission. This method may be a compromise between the foregoing two methods in the sense that a partial D2D subframe is used and the number of possible combinations is reduced.

Obviously, the UE may select Method 1), 2) or 3) according to a situation. For example, if the number of symbols available for D2D transmission is equal to or less than a predetermined number as a result of overlap, the UE may transmit a D2D signal in the symbols in Method 2) or 3). If the number of symbols available for D2D transmission is larger than the predetermined number, the UE may discontinue the D2D transmission in the whole subframe in Method 1), determining that the D2D transmission does not increase actual D2D performance.

FIG. 22 illustrates a BS and a UE applicable to an embodiment of the present invention. In a system including a relay, the BS and the UE may be replaced with the relay.

Referring to FIG. 22, a wireless communication system includes the BS 110 and the UE 120. The BS 110 includes a processor 112, a memory 114, and a radio frequency (RF) unit 116. The processor 112 may be configured to implement the procedures and/or methods proposed by the present invention. The memory 114 is connected to the processor 112 and stores various types of information related to operation of the processor 112. The RF unit 116 is connected to the processor 112 and transmits and/or receives radio signals. The UE 120 includes a processor 122, a memory 124, and an RF unit 126. The processor 122 may be configured to implement the procedures and/or methods proposed by the present invention. The memory 124 is connected to the processor 122 and stores various types of information related to operation of the processor 122. The RF unit 126 is connected to the processor 122 and transmits and/or receives radio signals. The BS 110 and/or the UE 120 may have a single antenna or multiple antennas.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent on each other may of course be combined to provide an embodiment or new claims can be added through amendment after the application is filed.

In the present disclosure, embodiments of the present invention are described centering on the data transmission/reception relations between a user equipment and a base station. In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. The base station may be replaced with terms such as a fixed station, Node B, eNode B (eNB), and access point. Also, the user equipment may be replaced with terms such as mobile station (MS) and mobile subscriber station (MSS).

The embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be driven by a processor. The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present disclosure is applicable to wireless communication devices such as a UE, a relay, an eNB, and the like.

What is claimed is:

1. A method for performing, by a user equipment (UE), a Device-to-Device (D2D) communication in a wireless communication system, the method comprising:
   receiving, from a base station, Sounding Reference Signal (SRS) configuration information;
   if a subframe having a same subframe number as an uplink subframe indicated by the SRS configuration information is configured as a D2D subframe, determining whether to transmit a D2D signal in the D2D subframe based on whether a timing adjustment value of the uplink subframe is applied to the D2D subframe; and
   if the timing adjustment value of the uplink subframe is not applied to the D2D subframe, transmitting, to the base station, a SRS in an uplink subframe without transmitting the D2D signal in the D2D subframe.

2. The method according to claim 1, wherein the determining whether to transmit the D2D signal further comprises:
   determining whether to transmit the D2D signal based on a cyclic prefix configured for the D2D subframe.

3. The method according to claim 2, wherein the determining whether to transmit the D2D signal further comprises:
   determining to transmit the D2D signal in the D2D subframe, when the timing adjustment value of the uplink subframe is applied to the D2D subframe and the cyclic prefix configured for the D2D subframe has a same length as a cyclic prefix configured for the uplink subframe.

4. The method according to claim 2, wherein the determining whether to transmit a D2D signal comprises:
   determining not to transmit the D2D signal in the D2D subframe, when the cyclic prefix configured for the D2D subframe has a different length from the cyclic prefix configured for the uplink subframe.

5. A User Equipment (UE) for performing a Device-to-Device (D2D) communication in a wireless communication system, the UE comprising:
   a Radio Frequency (RF) module; and
   a processor operably coupled with the RF module and configured to:
      receive, from a base station, Sounding Reference Signal (SRS) configuration information;
      if a subframe having a same subframe number as an uplink subframe indicated by the SRS configuration information is configured as a D2D subframe, determine whether to transmit a D2D signal in the D2D subframe based on whether a timing adjustment value of the uplink subframe is applied to the D2D subframe; and
      if the timing adjustment value of the uplink subframe is not applied to the D2D subframe, transmit, to the base station, a SRS in an uplink subframe without transmitting the D2D signal in the D2D subframe.

6. The UE according to claim 5, wherein the processor is further configured to:
   determine whether to transmit the D2D signal based on a cyclic prefix configured for the D2D subframe.

7. The UE according to claim 6, wherein the processor determines to transmit the D2D signal in the D2D subframe, when the timing adjustment value of the uplink subframe is applied to the D2D subframe and the cyclic prefix configured for the D2D subframe has a same length as a cyclic prefix configured for the uplink subframe.

8. The UE according to claim 6, wherein the processor determines not to transmit the D2D signal in the D2D subframe, when the cyclic prefix configured for the D2D subframe has a different length from the cyclic prefix configured for the uplink subframe.

9. The method according to claim 1, wherein the determining whether to transmit the D2D signal further comprises:
   determining to transmit the D2D signal in the D2D subframe, when the timing adjustment value of the uplink subframe is applied to the D2D subframe.

10. The UE according to claim 5, wherein the processor determines to transmit the D2D signal in the D2D subframe, when the timing adjustment value of the uplink subframe is applied to the D2D subframe.

* * * * *

UNITED STATES PATENT AND TRADEMARK OFFICE
CERTIFICATE OF CORRECTION

PATENT NO. : 10,128,996 B2  
APPLICATION NO. : 15/306030  
DATED : November 13, 2018  
INVENTOR(S) : Hanbyul Seo et al.

Page 1 of 1

It is certified that error appears in the above-identified patent and that said Letters Patent is hereby corrected as shown below:

On the Title Page

Item (54) title:  
Delete "TRANSMISSION" and insert -- TRANSMITTING --

Signed and Sealed this  
Sixteenth Day of July, 2019

Andrei Iancu  
*Director of the United States Patent and Trademark Office*